(12) United States Patent
Ohtomo et al.

(10) Patent No.: US 7,142,391 B2
(45) Date of Patent: Nov. 28, 2006

(54) THIN FILM HEAD, PRODUCING METHOD THEREOF AND MAGNETIC DISK APPARATUS

(75) Inventors: Shigekazu Ohtomo, Sayama (JP); Moriaki Fuyama, Hitachi (JP); Nobuo Yoshida, Odawara (JP); Hiroshi Fukui, Hitachi (JP)

(73) Assignee: Hitachi Global Storage Tehcnologies Japan, Ltd., Odawara (JP)

( * ) Notice: Subject to any disclaimer, the term of this patent is extended or adjusted under 35 U.S.C. 154(b) by 24 days.

(21) Appl. No.: 09/943,507

(22) Filed: Aug. 31, 2001

(65) Prior Publication Data
US 2003/0021064 A1    Jan. 30, 2003

(30) Foreign Application Priority Data
Jul. 25, 2001    (JP) .............................. 2001-224601

(51) Int. Cl.
*G11B 5/147* (2006.01)
(52) U.S. Cl. ..................................... 360/126
(58) Field of Classification Search ............... 360/126, 360/317, 318; 428/694 TS, 692
See application file for complete search history.

(56) References Cited

U.S. PATENT DOCUMENTS

| | | | | |
|---|---|---|---|---|
| 6,124,047 | A * | 9/2000 | Hasegawa | 428/692 |
| 6,317,289 | B1 * | 11/2001 | Sasaki | 360/126 |
| 6,407,892 | B1 * | 6/2002 | Shiroishi | 360/317 |
| 6,456,459 | B1 * | 9/2002 | Sasaki | 360/126 |
| 6,466,415 | B1 * | 10/2002 | Terunuma et al. | 360/317 |
| 6,487,041 | B1 * | 11/2002 | Yamanaka et al. | 360/126 |
| 6,501,618 | B1 * | 12/2002 | Kamijima et al. | 360/126 |
| 6,504,676 | B1 * | 1/2003 | Hiner et al. | 360/126 |
| 6,510,025 | B1 * | 1/2003 | Narumi et al. | 360/126 |
| 6,549,370 | B1 * | 4/2003 | Kamijima | 360/126 |
| 6,572,989 | B1 * | 6/2003 | Bian et al. | 428/694 TS |
| 6,577,475 | B1 * | 6/2003 | Sasaki et al. | 360/317 |
| 6,624,971 | B1 * | 9/2003 | Sasaki | 360/126 |
| 6,667,849 | B1 * | 12/2003 | Sasaki et al. | 360/126 |
| 6,687,096 | B1 * | 2/2004 | Sasaki et al. | 360/317 |
| 6,826,012 | B1 * | 11/2004 | Sasaki | 360/126 |
| 2002/0135934 | A1 * | 9/2002 | Mino et al. | 360/126 |

OTHER PUBLICATIONS

Lederman, IEEE Transaction of MAgnetics, V. 35, No. 2, pp. 794-799, 1998.*
Andricacos et al, IBM Journal of Research and Development, v. 42, No. 5, 1998.*

* cited by examiner

*Primary Examiner*—Tianjie Chen
(74) *Attorney, Agent, or Firm*—Antonelli, Terry, Stout and Kraus, LLP.

(57) ABSTRACT

A lower magnetic pole front end portion is provided on a lower magnetic pole main layer, and then, an upper magnetic pole front end portion or an upper magnetic pole front end layer is formed on the flat surface so as to enhance the track width accuracy of thin film head. The height of the lower magnetic pole front end portion is increased so as to enhance the magnetic field intensity. A projection step portion having a width larger than that of the upper magnetic pole front end layer is provided on the lower magnetic pole front end portion. The unnecessary medium in-plane magnetic field can be thus reduced in the off-track position. The respective parts of the head are corrected, thereby realizing a high recording magnetic field intensity exceeding 716 kA/m (9000Oe).

18 Claims, 17 Drawing Sheets

THIN FILM HEAD, PRODUCING METHOD THEREOF AND MAGNETIC DISK APPARATUS

BACKGROUND OF THE INVENTION

1. Field of the Invention

The present invention relates to a thin film head for use in a magnetic disk apparatus, particularly, to a thin film head for high coercivity media suitable for high density recording, a producing method thereof, and a magnetic disk apparatus.

2. Description of Background

In recent years, as the recording density of magnetic disk apparatuses has been increased, there has been strongly required development of thin film heads excellent in read/write characteristics together with improvement of the performance of recording media. At present, as a reading head, there is used a head using a MR (magnetoresistive effect) element or a GMR (giant magnetoresistive effect) element capable of providing high read output. Further, a TMR (tunnel magnetoresistive) element capable of providing a higher reading efficiency is developed. On the other hand, as a recording head, a prior art inductive thin film recording head using electromagnetic induction is used. A read/write type thin film head integrally forming the reading head and the recording head is employed.

To improve the recording characteristics of a thin film head, a strong and steep recording magnetic field must be generated in order to sufficiently record on recording media having a high coercivity. The track width is reduced with increasing of the track density. Magnetic saturation is caused at the magnetic pole front end portion of the thin film head so as to decrease the recording magnetic field. To cope with increasing of the track density, the processing accuracy of the small track width must be increased.

As shown in FIG. 3, a prior art thin film head has a substrate 1 made of a non-magnetic material. A lower magnetic shield 2 made of a soft magnetic material for enhancing the reading resolution to eliminate the influence of the external magnetic field is provided thereon. A reading gap 3 made of a non-magnetic insulating material is provided thereon. A reading element 4 consisting of an MR or GMR element is disposed in the reading gap. A lower magnetic pole 5 made of a soft magnetic material serving as an upper magnetic shield is provided thereon. A recording gap layer 6 and a coil insulating layer 7 are provided thereon. Lower layer coils 8 and upper layer coils 8' are disposed in the coil insulating layer. There may be a case of only one coil layer. An upper magnetic pole 9 made of a high saturation magnetic flux density material is provided. The entire head is protected by a protective layer 10. A rear end portion of upper magnetic pole 11 is contacted magnetically with the lower magnetic pole 5 through a through hole of the insulating layer 7 and the recording gap layer 6. The width of a front end portion of upper magnetic pole 12 in a floating surface 13 is processed into a width corresponding to the track width. The coils 8 and 8' are constructed so as to be arranged circumferentially about the rear end portion of upper magnetic pole.

A recording electric current is applied to the coils 8 and 8' so as to induce a magnetic flux in the upper magnetic pole 9 and the lower magnetic pole 5. A recording magnetic field generated from the front end of the recording gap records a signal onto a recording medium 14 moving slightly away from the floating surface 13. The magnetic flux is concentrated in the vicinity of the recording gap from the lower magnetic pole and the upper magnetic pole. As a result, a high magnetic field is generated. The length in the front end portion of upper magnetic pole is contacted with the recording gap layer 6 is called a gap depth Gd. As the length is reduced, the recording magnetic field is increased since the magnetic flux is concentrated onto the magnetic pole front end.

When the upper magnetic pole 9 is formed, a photoresist is coated onto the coil insulating layer 7 and the recording gap layer 6. The photoresist is exposed and developed through a predetermined mask of the shape of the upper magnetic pole so as to remove the photoresist in a portion to be the shape of the upper magnetic pole. A high saturation magnetic flux density material as the upper magnetic pole is formed in the removed portion by a plating method.-In the prior art thin film head, as described above, the photoresist for forming the upper magnetic pole is formed on a high and steep slope 15 of the coil insulating layer 7. When the photoresist is exposed, the shape of the upper magnetic pole cannot be formed accurately due to light reflection from the slope and insufficient depth of focus. In particular, a problem arises when a small track width of the rear end portion of upper magnetic pole is formed.

As a method for solving this point, as described in Japanese Published Unexamined Patent Application No. 2000-276707, there is proposed a method for separating an upper magnetic pole into an upper magnetic pole front end layer, an upper magnetic pole rear end layer, and an upper magnetic pole top layer. In this method, as shown in FIG. 4, a recording gap layer 6 is formed, and then, a first non-magnetic insulating layer 16 for defining a gap depth. A photoresist for forming an upper magnetic pole front end layer 17 and an upper magnetic pole rear end layer 18 is formed thereon. The photoresist is exposed and developed to remove portions to be the shapes of the upper magnetic pole front end layer 17 and the upper magnetic pole rear end layer 18. A high saturation magnetic flux density material as the upper magnetic pole front end layer 17 and the upper magnetic pole rear end layer 18 is formed in the removed portions by a plating method. Further, the gap between the upper magnetic pole front end layer 17 and the upper magnetic pole rear end layer 18 is buried by a second nonmagnetic insulating layer 19. The upper magnetic pole front end layer 17, the upper magnetic pole rear end layer 18, and the second non-magnetic insulating layer 19 are flattened by polishing. A coil insulating layer 7, lower layer coils 8, upper layer coils 8', an upper magnetic pole top layer 20, and a protective layer 10 are formed thereon. In this method, the photoresist for forming the upper magnetic pole front end layer 17 is formed on the first non-magnetic insulating layer 16 having a step smaller than that of the slope 15 of the coil insulating layer in the prior art shown in FIG. 3. The problems of light reflection from the substrate or insufficient depth of focus can be eliminated so as to enhance the small track width processing accuracy.

In the thin film head shown in FIG. 4, the upper magnetic pole front end layer 17 is formed on the step of the first non-magnetic insulating layer 16. A very small track width of 0.4 μm or less which has been required in recent years is difficult to be formed at high accuracy.

As the track is smaller and the coercivity of the media is higher, the recording magnetic field required for the recording head is increased more and more.

SUMMARY OF THE INVENTION

The present invention solves these difficulties and an object of the present invention is to provide a thin film head permitting high density recording and reading, a producing method thereof, and a magnetic disk apparatus using such a thin film head.

To achieve the foregoing object, in the present invention, a thin film head comprising in combination: a reading part consisting of a magnetic shield layer and a reading element formed on a substrate; and a recording part consisting of a lower magnetic pole, an upper magnetic pole, coils, and a non-magnetic insulating layer; wherein the lower magnetic pole consists of a lower magnetic pole main layer, a lower magnetic pole front end portion, and a lower magnetic pole rear end portion; the upper magnetic pole has its front end portion opposite to the lower magnetic pole front end portion through a recording gap layer and its rear end portion connected magnetically to the lower magnetic pole rear end portion; the coils are disposed between the lower magnetic pole main layer and the upper magnetic pole; the non-magnetic insulating layer is filled between the coils, the lower magnetic pole main layer and the upper magnetic pole; the lower magnetic pole front end portion has a width in the track width direction smaller than the width of the lower magnetic pole main layer and has, at the upper magnetic pole side, a projection step portion having a width in a floating surface almost equal to the track width; the upper magnetic pole consists of an upper magnetic pole front end layer, an upper magnetic pole rear end layer, and an upper magnetic pole top layer; and a surface for defining a gap depth of the lower magnetic pole front end portion is formed almost perpendicular to the recording gap surface, so that the height of the lower magnetic pole front end portion in the medium running direction is 0.3 μm to 2 μm.

The width of the lower magnetic pole front end portion in the track width direction is desirably 1 μm to 30 μm.

The surface other than the projection step portion of the lower magnetic pole front end portion at the upper magnetic pole side is inclined at, at least one inclination angle to the recording gap surface.

The lower magnetic pole front end portion has a width in the track width direction smaller than the width of the lower magnetic pole main layer and has, at the upper magnetic pole side, a projection step portion having a width in a floating surface almost equal to the track width, and having a width in the position away from the floating surface in the head rear portion direction larger than that of the upper magnetic pole; and a surface for defining a recording gap depth of the lower magnetic pole front end portion is formed almost perpendicular to the recording gap surface.

The upper magnetic pole front end layer has a width corresponding to the track width from the floating surface to the magnetic pole expansion position, so as to increase the width from the magnetic pole expansion position to the head rear portion direction.

The upper magnetic pole front end layer consists of a plurality of magnetic layers having different saturation magnetic flux densities, so that the magnetic layer of the recording gap side has a saturation magnetic flux density higher than that of the magnetic layer at a side farther from the recording gap.

The saturation magnetic flux density of at least some magnetic materials for use in the upper magnetic pole front end layer or the lower magnetic pole front end portion is desirably higher than that of the magnetic material for use in the lower magnetic pole main layer and the upper magnetic pole top layer.

The specific resistance of the magnetic material for use in the lower magnetic pole main layer or the upper magnetic pole top layer is desirably higher than that of the magnetic material for use in the upper magnetic pole front end layer or the lower magnetic pole front end portion.

The lower magnetic pole front end portion is produced on the lower magnetic pole main layer by a frame plating method.

A magnetic disk apparatus comprises: a magnetic recording medium; a motor for driving the same; a magnetic head for recording and reproduction onto the magnetic recording medium; a mechanism for positioning the magnetic head, a circuit system for controlling these; and a circuit system for supplying a recording signal to the magnetic head and processing a reading signal from the magnetic head; wherein at least the one thin film head is mounted as the magnetic head, and the magnetic recording medium having a coercivity of 279 kA/m (3500 Oe) or more is used.

DETAILED DESCRIPTION OF THE PREFERRED EMBODIMENT

The present invention will be described hereinbelow in detail by embodiments.

Embodiment 1

Figure 2:
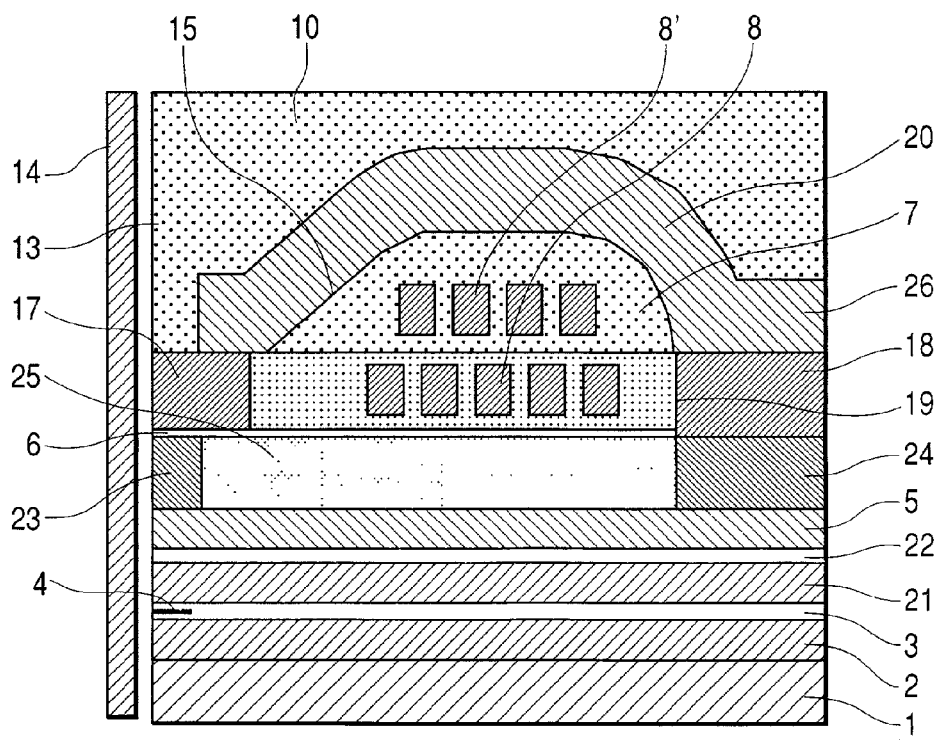
FIG. 2 is a cross-sectional view of the thin film head of the present invention.

FIG. 2 shows a cross-sectional view of a thin film head of the present invention. On a substrate 1 made of a non-magnetic material, there is provided a lower magnetic shield 2 made of a soft magnetic material for enhancing the reading resolution to eliminate the influence of the external magnetic field. A reading gap 3 made of a non-magnetic insulating material is provided thereon. A reading element 4 consisting of an MR or GMR element is disposed in the reading gap. An upper magnetic shield 21 is provided thereon. A separate layer 22 made of a non-magnetic material for separating a recording head and a reading head is provided thereon. A lower magnetic pole main layer 5, a lower magnetic pole front end portion 23, and a lower magnetic pole rear end portion 24 are provided thereon. A non-magnetic insulating layer 25 is filled between the lower magnetic pole front end portion 23 and the lower magnetic pole rear end portion 24.

The lower magnetic pole front end portion 23, the lower magnetic pole rear end portion 24, and the non-magnetic insulating layer 25 are flattened by polishing. A recording gap layer 6, an upper magnetic pole front end layer 17, and an upper magnetic pole rear end layer 18 are provided thereon. A second nonmagnetic insulating layer 19 and lower layer coils 8' are provided. The surface of the upper magnetic pole front end layer 17, the upper magnetic pole rear end layer 18, and the second non-magnetic insulating layer 19 is flattened by polishing. A coil insulating layer 7 and upper layer coils 8' are disposed thereon. An upper magnetic pole top layer 20 is provided. The entire head is protected by a protective layer 10. The front end of the upper magnetic pole top layer is disposed so as to be recessed from a floating surface.

A rear end portion 26 of the upper magnetic pole top layer and the upper magnetic pole rear end layer 18 are connected magnetically to the lower magnetic pole rear end portion 24. The lower layer coils 8 and the upper layer coils 8' are constructed so as to be arranged circumferentially about the upper magnetic pole rear end layer 18 and the rear end portion 26 of the upper magnetic pole top layer. A recording electric current is applied to the lower layer coils 8 and the upper layer coils 8'. A magnetic flux is induced in the upper magnetic pole front end layer 17, the upper magnetic pole top layer 20, the upper magnetic pole rear end layer 18, the lower magnetic pole rear end portion 24, the lower magnetic pole main layer 5, and the lower magnetic pole front end portion 23. A recording magnetic field generated from the front end of the recording gap records a signal onto a recording medium 14 moving slightly away from a floating surface 13.

In this embodiment, the upper magnetic shield 21 is separated from the lower magnetic pole main layer 5 by the separate layer 22. As in the prior art of FIGS. 3 and 4, the lower magnetic pole main layer may serve as the upper magnetic shield. The recording gap depth is defined by the depth of the lower magnetic pole front end portion. The surface of the lower magnetic pole front end portion for defining the recording gap depth is formed so as to be almost perpendicular to the recording gap surface.

Figure 1:
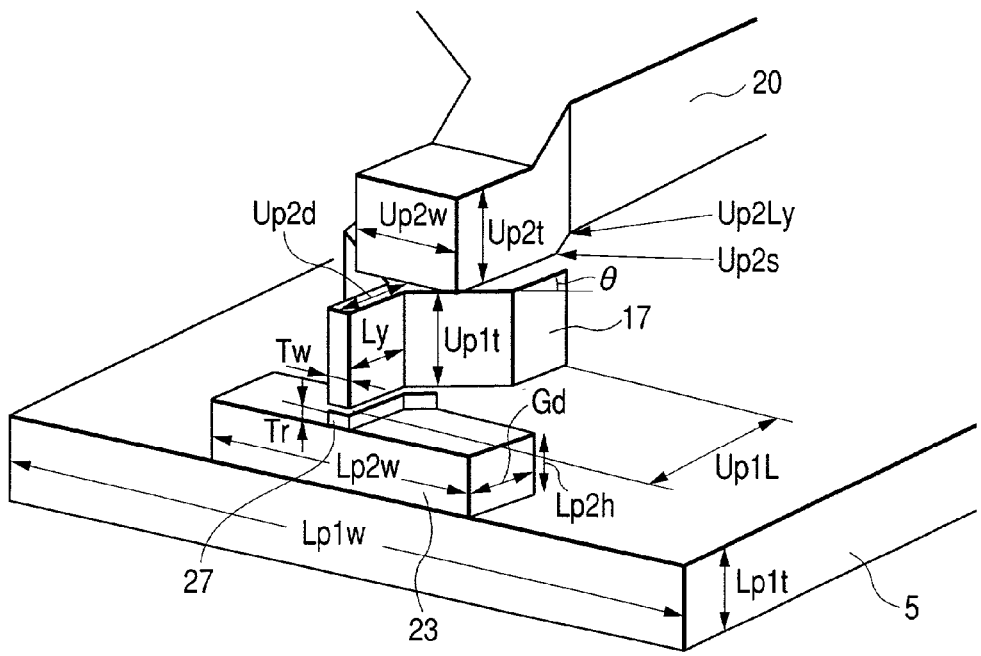
FIG. 1 is a perspective view of a thin film head of the present invention.

FIG. 1 shows a perspective view of the construction in the vicinity of the head front end of a thin film head of the present invention. This drawing shows only part of the lower magnetic pole main layer 5, the lower magnetic pole front end portion 23, the upper magnetic pole front end layer 17, and the upper magnetic pole top layer 20. As shown in the drawing, in the thin film head of the present invention, the lower magnetic pole front end portion 23 has a width Lp2w smaller than the lower magnetic pole 5, a length (depth) corresponding to a gap depth Gd, and a height Lp2h. A portion opposite to the upper magnetic pole by interposing the recording gap has a projection step portion 27 having a width almost equal to a track width Tw of the upper magnetic pole. The height of the projection step portion is called a trim depth Tr.

The upper magnetic front end layer 17 has a width almost equal to the track width to a magnetic pole expansion position Ly in the head rear direction. The width is increased at an expansion angle θ from the magnetic pole expansion position Ly in the head rear direction to a maximum width Up1w. The length of the upper magnetic pole front end layer 17 is Up1L, and the thickness is Up1t. The front end of the upper magnetic pole top layer 20 is away from the floating surface by an upper magnetic pole depth Up2d, and has a width Up2fw of the upper magnetic pole front end and a thickness Up2t. The upper magnetic pole top layer 20 has a shape to be increased at the expansion angle φ from a contraction position Up2Ly in the head rear portion to the upper magnetic pole width Up2w. The upper magnetic pole top layer 20 is flat to a rising position Up2s of the upper magnetic pole top layer. The upper magnetic pole top layer 20 from the Up2s is formed on the slope 15 of the coil insulating layer.

In the thin film head of the present invention having the above-mentioned construction, a magnetic field is calculated by computer simulation. The recording magnetic field intensity of the thin film head of the present invention is compared with that of the prior art thin film head shown in FIG. 4. The dimensions of the thin film head of the present invention are: track width Tw=0.35 µm, gap length Gl =0.13 µm, Gd=1 µm, Lp2w=8 µm, Tr=0.2 µm, Ly=0.8 µm, Up1t=2 µm, Up1L=3.5 µm, Up1w=4 µm, θ=45°, Up2d=1 µm, Up2t=3 µm, Up2w=3 µm, Up2Ly=4 µm, Up2s=4 µm, φ=45°, and Up2w=26 µm. The change of the recording magnetic field intensity due to the change of the height Lp2h of the lower magnetic pole front end portion 23 is calculated. The width Lp1w of the lower magnetic pole 5 is 100 µm, and the thickness Lp1t of the lower magnetic pole is 2 µm.

Figure 4:
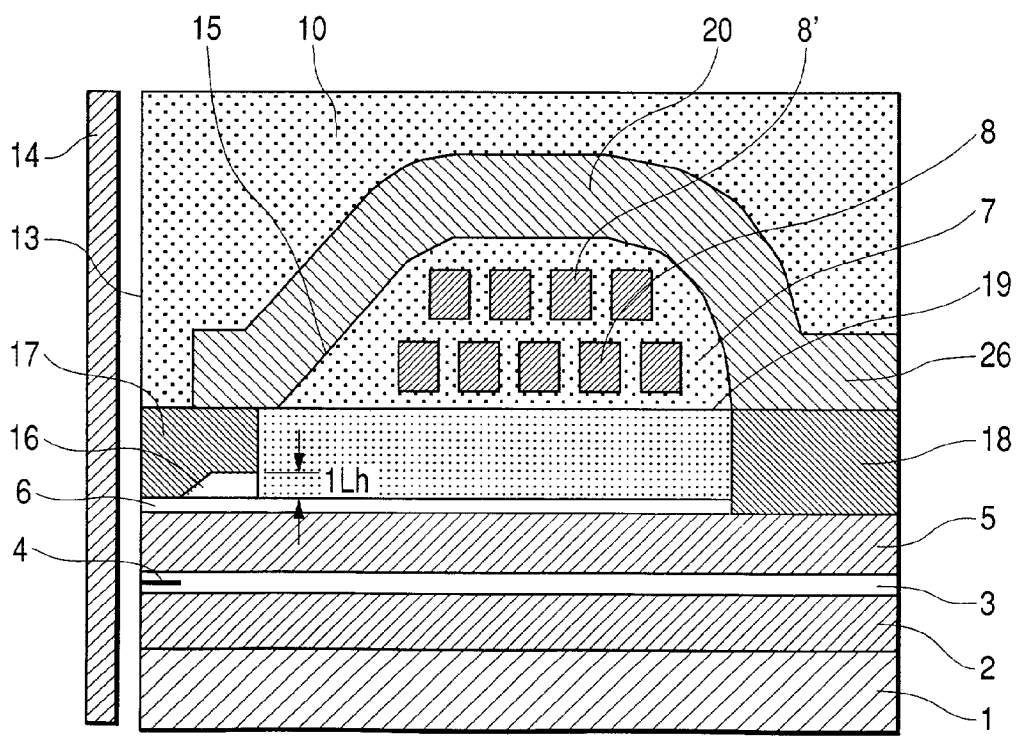
FIG. 4 is a cross-sectional view showing another example of the prior art thin film head.

In the prior art thin film head shown in FIG. 4, the thickness Ilh of the first non-magnetic insulating layer 16 for determining the gap depth is 0.4 µm, the film thickness Lp1t of the lower magnetic pole main layer 5 is 2.5 µm, and other dimensions are the same as those of the thin film head of the present invention.

As a magnetic material for use in the thin film head of the present invention, a 46Ni—Fe film (a saturation magnetic flux density Bs=1.68 T) is used for the lower magnetic pole main layer 5 and the upper magnetic pole top layer 20. A CoNiFe film (Bs=2.0 T) is used for the lower magnetic pole front end portion 23, the lower magnetic pole rear end portion 24, the upper magnetic pole front end layer 17, and the upper magnetic pole rear end layer 18. The same material as that of the thin film head of the present invention is used for the prior art thin film head. The lower magnetic pole 5 is a CoNiFe film (Bs=2.0T) for comparison.

Figure 11:
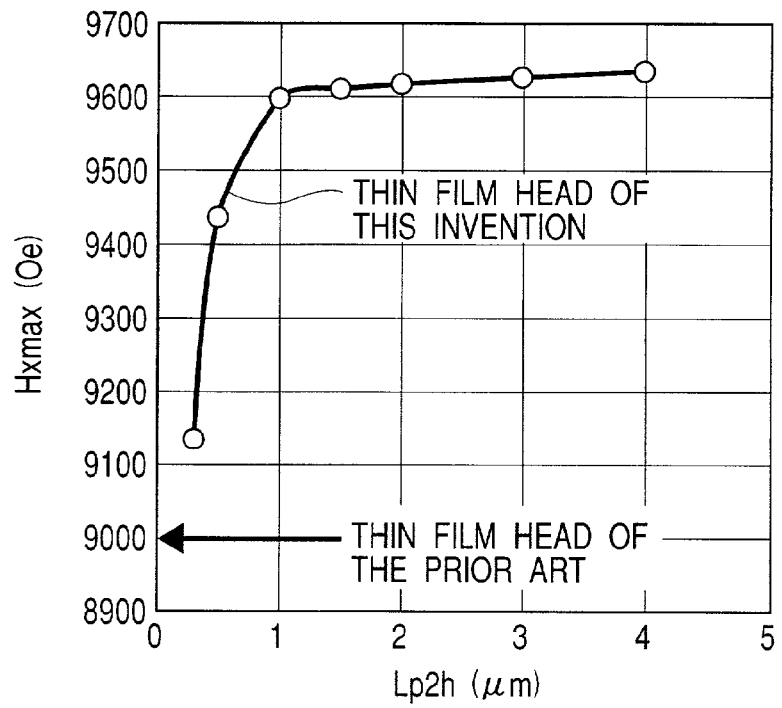
FIG. 11 is a diagram showing the relation between the recording magnetic field intensity Hxmax and the height Lp2h of the lower magnetic pole front end portion of the thin film head of the present invention.

FIG. 11 shows maximum magnetic field intensity Hxmax in the medium running direction in the position as the medium center away by 25 nm from the floating surface, in the center position of the track width. This value is called a magnetic field intensity. As shown in the drawing, the magnetic field intensity of the prior art thin film head is about 9000 Oe. The magnetic field intensity of the thin film head of the present invention in the case of a height Lp2h=0.3 µm of the lower magnetic pole front end portion is higher than that of the prior art thin film head. With increase of the Lp2h, the magnetic field intensity of the thin film head of the present invention is increased abruptly. Increase of the magnetic field intensity is saturated at the Lp2h of 1 µm or more. The reason why the magnetic field intensity is increased with the Lp2h lies in that since the distance between the upper magnetic pole front end layer 17 and the upper magnetic pole top layer 20, and the lower magnetic pole 5 is increased, it is thus considered that the leakage flux therebetween is reduced, so that the magnetic flux reaches in the vicinity of the recording gap of the front end of the head with less decay.

As described above, the lower magnetic pole front end portion 23 is provided, and the height Lp2h is 1 µm or more. As compared with the prior art thin film head, the magnetic field intensity can be largely increased by about 600 Oe or more. The increase of the magnetic field is very advantageous for recording a signal having a high density onto a high-coercivity medium.

When the lower magnetic pole front end portion 23 is provided, a photoresist for producing the upper magnetic pole front end layer can be formed on the flat surface. Unlike the prior art, deterioration of the track width accuracy due to abnormal reflection due to the step for exposure or insufficient depth of focus can be eliminated. A small track width can be formed at high accuracy.

The height Lp2h of the lower magnetic pole front end portion is 0.3 µm or more as shown in FIG. 11 to provide the effect of increasing the magnetic field intensity as compared with the prior art, and is 0.7 µm or more to provide the sufficient effect of increasing the magnetic field. As the magnetic head, the change of the magnetic field is preferably small when the respective parts of the head are changed. In view of this, the Lp2h is more preferably 0.7 µm or more for sufficiently increasing the magnetic field and decreasing the change of the magnetic field.

When the Lp2h is too large, the gap between the recording gap and the reading gap is increased to impose the following problem. The gap between the recording gap and the reading gap is too large, so as to increase a deviation of the position of the reading track and the recording track on the magnetic disk. It is thus difficult to control the track position. As the gap between the recording gap and the reading gap is increased, a region for recording a signal onto the magnetic disk is small so as to lower the format efficiency. From such a problem, the recording and reading gap must be less than 6 µm.

In the thin film head of the present invention, the gap between the center of the reading element 4 and the upper shield 21 is 0.04 µm, the thickness of the upper shield 21 is 1.3 µm, the thickness of the separate layer 2 is 0.5 µm, the thickness of the lower magnetic pole main layer 5 is 2 µm, and the distance between the upper end of the lower magnetic pole front end portion and the center of the recording gap is 0.065 μm. In order that the recording and reading gap is less than 6 μm, an allowance of about 0.1 μm is provided and the height Lp2h of the lower magnetic pole front end portion must be 2 μm or less. To provide an allowance to the variation of the dimensions, the Lp2h is more preferably 1.5 μm or less.

Figure 12:
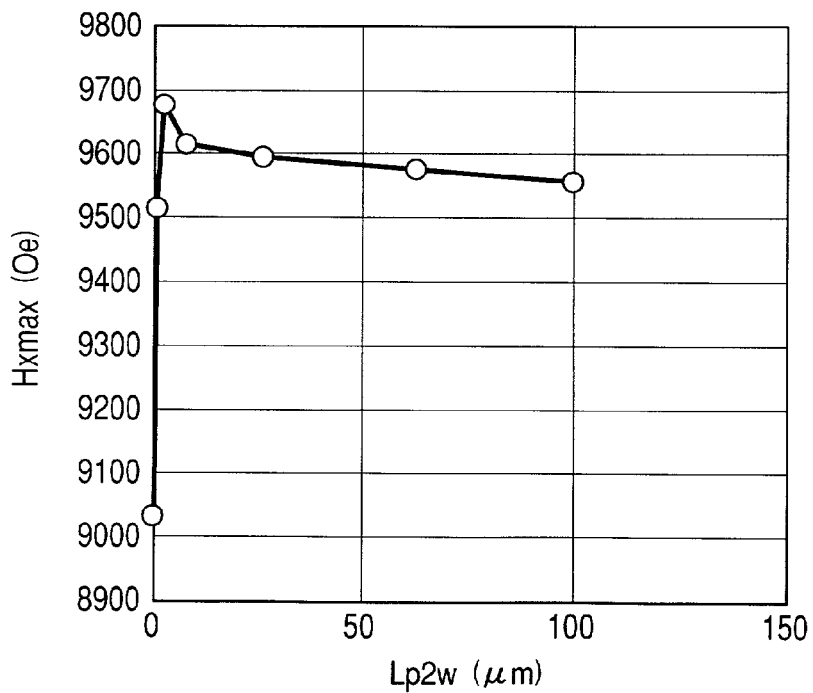
FIG. 12 is a diagram showing the relation between the recording magnetic field intensity Hxmax and the width Lp2w of a lower magnetic pole front end portion in the track width direction of the thin film head of the present invention.

FIG. 12 shows the change of the magnetic field intensity when the width Lp2w of the lower magnetic pole front end portion is changed. The height Lp2h of the lower magnetic pole front end portion is 1.4 μm. Other shapes are the same as those of FIG. 11. As shown in the drawing, with increase of the Lp2w, the magnetic field intensity is increased abruptly, and is maximum at the Lp2w of about 3 μm, thereafter it is decreased gradually.

The magnetic field intensity is low when the Lp2w is below 3 μm, because it is considered that the lower magnetic pole front end portion is considered to cause magnetic saturation. The magnetic field is decreased gradually when the Lp2w is above 3 μm, because it is considered that, when the Lp2w is large, the leakage flux from the upper magnetic pole to the end portion of the lower magnetic pole front end portion is increased to relatively decrease the magnetic flux in the vicinity of the recording gap.

The Lp2w is desirably 1 μm or more. When the Lp2w is 1 μm or more, a magnetic field intensity sufficiently higher than that of the prior art thin film head can be obtained. When the Lp2w is less than 3 μm, the change of the magnetic field due to variation of the Lp2w is large. In order that a stable magnetic field intensity can be obtained to the change of the Lp2w, the Lp2w is more preferably 3 μm or more. When the Lp2w is 3 μm or more, the magnetic field intensity is decreased gradually.

In the thin film head of the present invention, to obtain a high magnetic field intensity, as the material of the lower magnetic pole front end portion, a magnetic material having a high saturation magnetic flux density Bs of above 1.6 T, preferably 1.8 to 2.2 T. Specific materials include an Ni—Fe film or Co—Fe—Ni film having 46 Ni as a main composition. These high Bs films, particularly, the Co—Fe—Ni film itself having a high saturation magnetic flux density Bs of 1.8 to 2.2 T generally has a problem of corrosion resistance. When the protective film is deposited on the floating surface, any problem such as corrosion cannot be caused. The floating surface protective film is formed very thinly so as to have a thickness of 3 to 6 nm. When a fine polishing scratch during polishing the floating surface remains, the floating surface protective film cannot sufficiently cover the scratch and the scratch may remain as defect. In this case, in the cleaning process of the producing processing after that, corrosion can be caused from this defect portion. To prevent this and enhance the producing yield, the exposing width of the lower magnetic pole front end portion using the high Bs film to the floating surface must be reduced.

With increase of the recording density in recent years, the flying height of the floating surface on the recording medium surface must be reduced. For this reason, the width of the floating surface of the slider equipped with the thin film head in the track width direction must be reduced. The upper magnetic shield 2, the lower magnetic shield 21, the lower magnetic pole main layer 5, or the lower magnetic pole front end portion 23 of the head outside the floating surface width of the slider is subject to groove processing by ion milling during groove processing of the slider and a step is formed to the floating surface, when the floating surface width of the slider in the position of the thin film head is smaller than the width of the upper magnetic shield 2, the lower magnetic shield 21, the lower magnetic pole main layer 5, or the lower magnetic pole front end portion 23 of the head.

The floating surface protective film is formed by the processing after that. As described above, the protective film is formed to be very thin. When the projection step portion cannot be protected sufficiently, the protective film can be defected. When the lower magnetic pole front end portion having a high Bs and low corrosion resistance has a width larger than the floating surface width, corrosion can be caused in the projection step portion. The floating surface width of the slider in the position of the thin film head tends to be reduced from about 200 μm of the prior art to about 60 μm or less. Based on these, to reduce the defect percentage due to corrosion of the lower magnetic pole front end portion and to enhance the producing yield, a margin of the processing dimension shift is provided so that the width Lp2w of the lower magnetic pole front end portion must be 50 μm or less, and more preferably, 30 μm or less.

Figure 13:
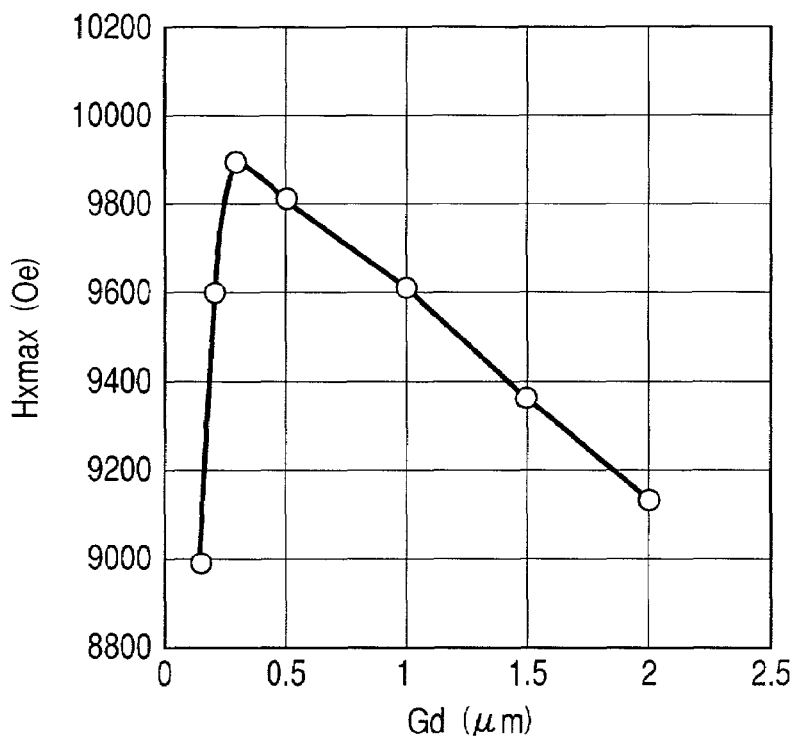
FIG. 13 is a diagram showing the relation between the recording magnetic field intensity Hxmax and the gap depth Gd of the thin film head of the present invention.

FIG. 13 shows the change of magnetic field intensity when the gap depth Gd is changed. The height Lp2h of the lower magnetic pole front end portion is 1.4 μm. Other shapes are the same as those of FIG. 11. Since the Gd is 2 μm, the magnetic field intensity is increased with decrease of the Gd. When the Gd is about 0.3 μm, the magnetic field intensity is maximum. When the Gd is less than 0.3 μm, the magnetic field intensity is decreased abruptly. With the Gd of less than 0.3 μm, the magnetic field intensity is decreased, because the lower magnetic pole front end portion is magnetic-saturated. With the Gd of 0.3 μm or more, the magnetic field intensity is decreased, because with increase of the Gd, the magnetic flux passing through the gap depth side of the lower magnetic pole front end portion is increased, so that the concentration of the magnetic flux in the vicinity of the recording gap of the floating surface side is reduced.

When the Gd is less than 0.3 μm, a high magnetic field can be obtained. However, the change of the magnetic field due to the change of the Gd is steep, so that the recording characteristics are likely to be varied. When the Gd is less than 0.3 μm, the mechanical strength of the lower magnetic pole front end portion is reduced, and a problem such as peeling is likely to be caused. The Gd is thus desirably 0.3 μm or more. When the Gd exceeds 2 μm, the magnetic field intensity is reduced largely. The Gd is preferably 2 μm or less.

Figure 14:
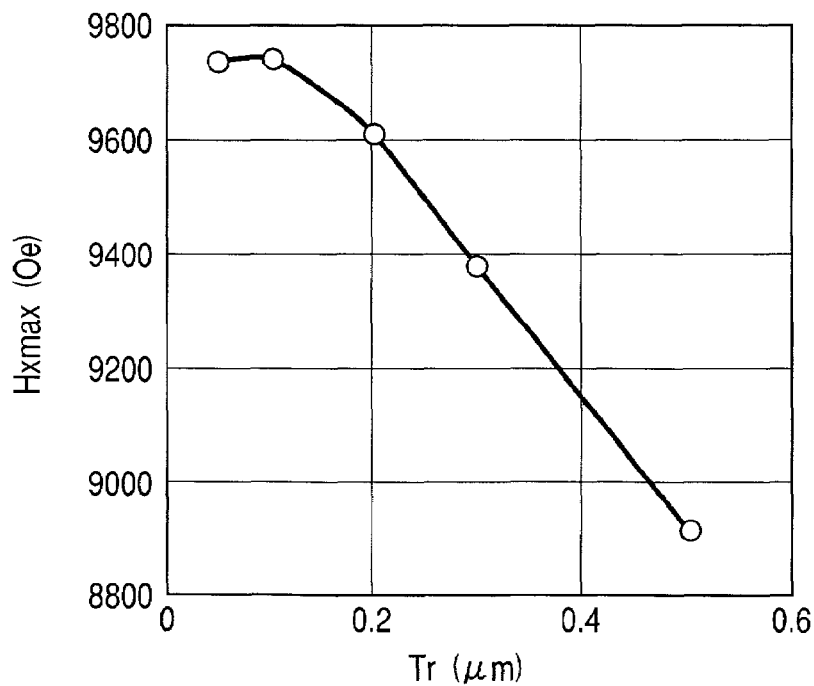
FIG. 14 is a diagram showing the relation between the recording magnetic field intensity Hxmax and the trim depth of the thin film head of the present invention.

FIG. 14 shows the change of the magnetic field intensity of the trim depth Tr. The height Lp2h of the lower magnetic pole front end portion is 1.4 μm. Other shapes are the same as those of FIG. 11. As shown in the drawing, the magnetic field intensity is decreased as the trim depth Tr is increased. To obtain the magnetic field intensity above that of the prior art head, the Tr is desirably 0.4 μm or less. When the Tr is less than 0.1 μm, the magnetic field intensity is almost constant. When the Tr is less than 0.1 μm, the medium in-plane magnetic field component in the position away from the center of the track to the outside of the track end portion is not reduced sufficiently. The magnetic field intensity becomes a value close to the medium coercivity or exceeding the medium coercivity. In such a case, an erasing width Twe for erasing a signal by the recording head is unnecessarily larger than a recording signal width Tww. In some cases, the signal of the adjacent track will be erased or decayed. The trim depth must be 0.1 μm or more.

Figure 5A:
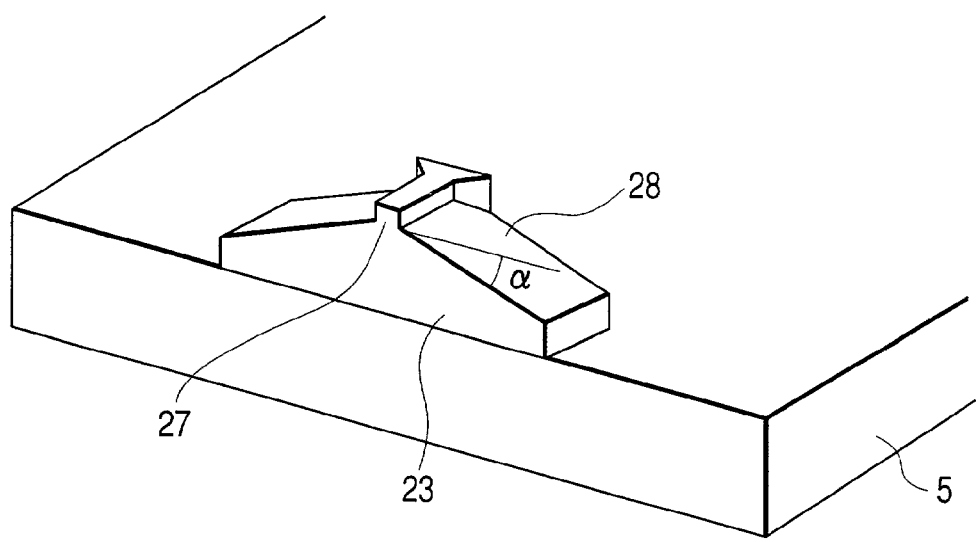
FIG. 5 is a perspective view showing the shape of a lower magnetic pole front end portion on a lower main layer of the thin film head of the present invention.
Figure 15:
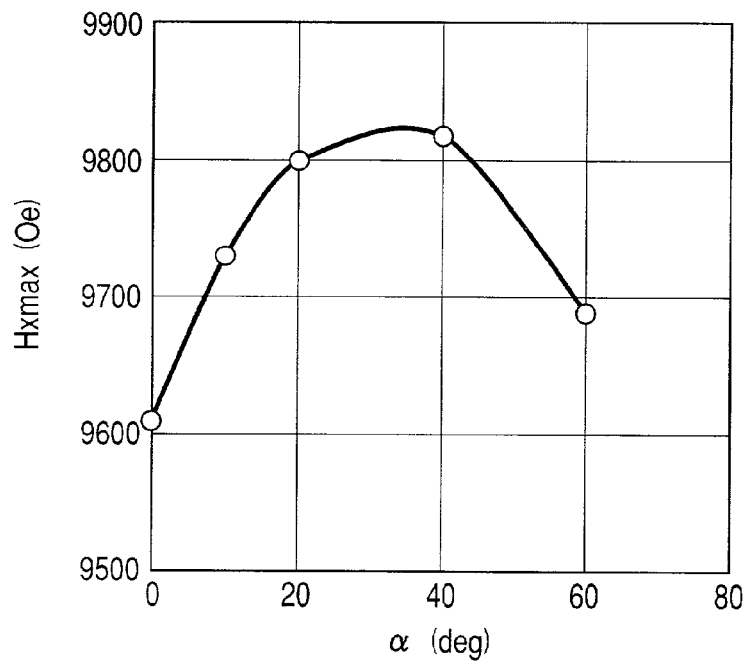
FIG. 15 is a diagram showing the relation between the recording magnetic field intensity Hxmax and the taper angle, i.e., the inclination angle α of the upper end surface of the lower magnetic pole front end portion of the thin film head of the present invention.

In the thin film head of the present invention, as in the shape of the lower magnetic pole front end portion shown in FIG. 5(a), a taper angle α can be provided to an upper end surface 28 of the lower magnetic pole front end portion. FIG. 15 shows the change of the magnetic field intensity with the taper angle α. The height Lp2h of the lower magnetic pole front end portion is 1.4 µm. Other shapes are the same as those of FIG. 11. When the taper angle is provided to the upper end surface of the lower magnetic pole front end portion, the leakage flux from the upper magnetic pole front end layer to the end portion of the lower magnetic pole front end portion is decreased so as to increase the magnetic field intensity.

Figure 5B:
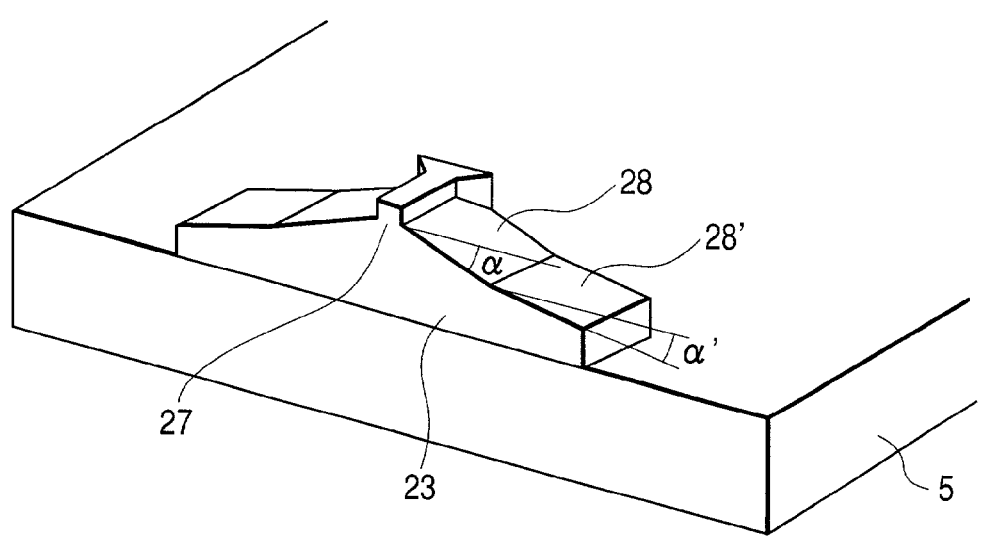

As shown in FIG. 15, with increase of the taper angle α, the magnetic field intensity is increased. The magnetic field intensity is maximum at α=20° to 40°, and then is decreased. The magnetic field intensity is decreased at the taper angle of above 40° because the lower magnetic pole front end portion is saturated. The taper angle α is preferably 60° or less for obtaining the effect for increasing the magnetic field. FIG. 5(b) shows an example in which the lower magnetic pole front end portion has two or more upper end surfaces 28 and 28' and two or more taper angles α and α'. When the taper angle has two or more values, the effect of increasing the magnetic field by the taper angles is provided likewise.

Figure 16:
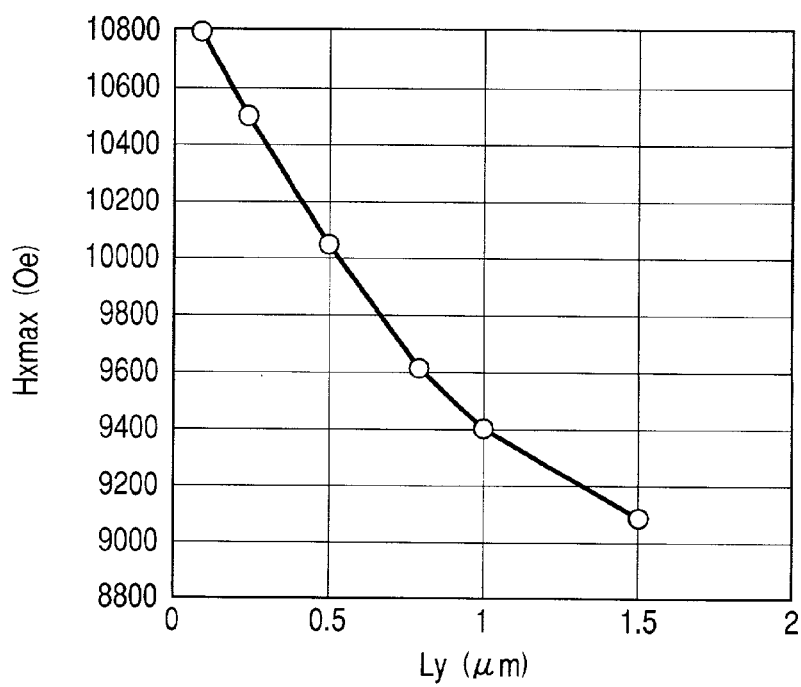
FIG. 16 is a diagram showing the relation between the recording magnetic field intensity Hxmax and the magnetic pole expansion position Ly of an upper magnetic pole front end layer of the thin film head of the present invention.

FIG. 16 shows the change of the magnetic field intensity with the magnetic pole expansion position Ly of the upper magnetic pole front end layer described in the description of FIG. 1. The height Lp2h of the lower magnetic pole front end portion is 1.4 µm. Other shapes are the same as those of FIG. 11. With decrease of the Ly, the magnetic field intensity is increased largely. When the Ly exceeds 1.5 µm, the magnetic field intensity is lower than the magnetic field intensity 9000 Oe of the prior art head. The Ly is preferably 1.5 µm or less. As the Ly is decreased, the magnetic field intensity is increased. However, from the limit of the resolution of the photoresist, a radius of curvature R of at least about 0.2 µm is provided in the vicinity of the Ly. When the Ly is less than 0.2 µm, the change of the track width by the processing accuracy of the Ly. To ensure a Tw width accuracy, the Ly is preferably 0.2 µm or more.

Figure 3:
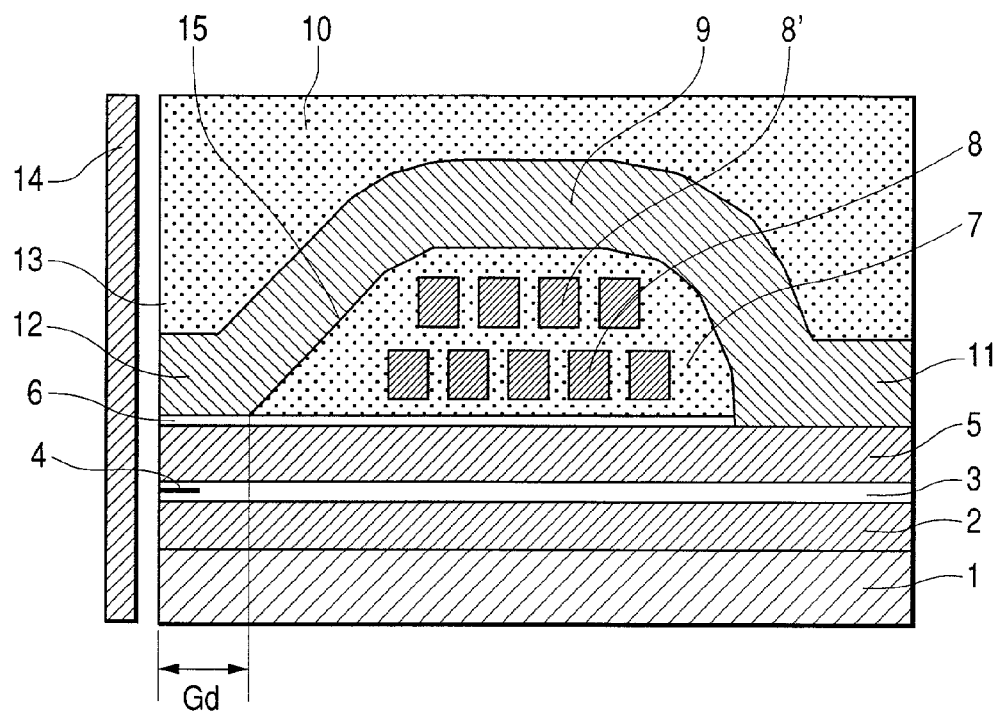
FIG. 3 is a cross-sectional view showing one example of a prior art thin film head.

In the prior art thin film head shown in FIG. 3 or 4, the upper magnetic pole 9 or the upper magnetic pole front end layer 17 for defining the track width is formed on the slope 15 of the coil insulating layer or the projection step of the first insulating layer 16. When the magnetic pole expansion position Ly is set in the vicinity of the gap depth Gd, the track width in the vicinity of the Ly is affected by the magnetic pole expansion shape by the reflection of exposure from the slope or the projection step so as to increase an error. The Ly must be at least 0.3 µm or more larger than the Gd. In the prior art thin film head, it is difficult to largely reduce the Ly to increase the magnetic field intensity.

Figure 7:
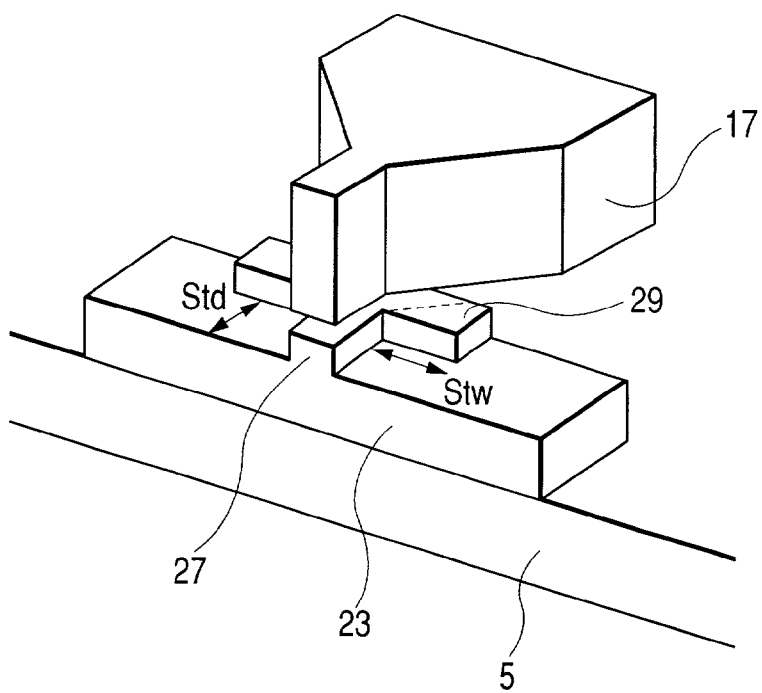
FIG. 7 is a perspective view showing the shape of a projection step portion provided on a lower magnetic pole front end portion on a lower magnetic pole main layer of another embodiment of the thin film head of the present invention as well as the shape of an upper magnetic pole front end portion.

In the thin film head of the present invention, as described above, the upper magnetic pole front end layer for defining the track width can be formed on the flat surface of the lower magnetic pole front end portion. The positional relation between the Ly and Gd as described above is not limited. As shown in FIGS. 7 and 11, in the thin film head of the present invention, the change of the magnetic field intensity with the Ly is larger than the change of magnetic field intensity with the Gd. The Ly is smaller than the Gd so as to realize a thin film head having a high magnetic field intensity.

Figure 17:
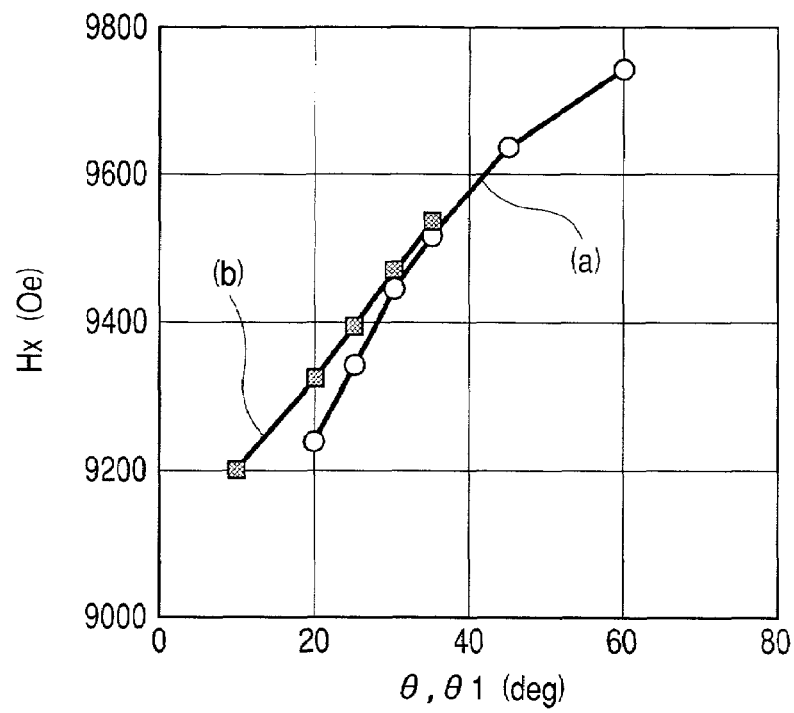
FIG. 17 is a diagram showing the relation between the recording magnetic field intensity Hxmax and the magnetic pole expansion angle θ of an upper magnetic pole front end layer of the thin film head of the present invention.

The curve (a) of the FIG. 17 shows the change of the magnetic field intensity with the expansion angle θ of the upper magnetic pole front end layer. The height Lp2h of the lower magnetic pole front end portion is 1.4 µm. Other shapes are the same as those of FIG. 11. As shown in the drawing, with increase of θ, the magnetic field intensity is increased, which is then increased gently at 45° or more. When the expansion angle θ of the upper magnetic pole front end layer is too large, the radius of curvature R in the vicinity of the Ly is increased by scattering of light in the resist when exposing the resist, so that the track width accuracy tends to be reduced. To prevent this, the expansion angle θ is preferably 60° or less, more preferably, below 50° or less. When the expansion angle θ is less than 20°, the magnetic field intensity is reduced significantly. The expansion angle θ is preferably 20° or more, more preferably, 30° or more.

Figure 6:
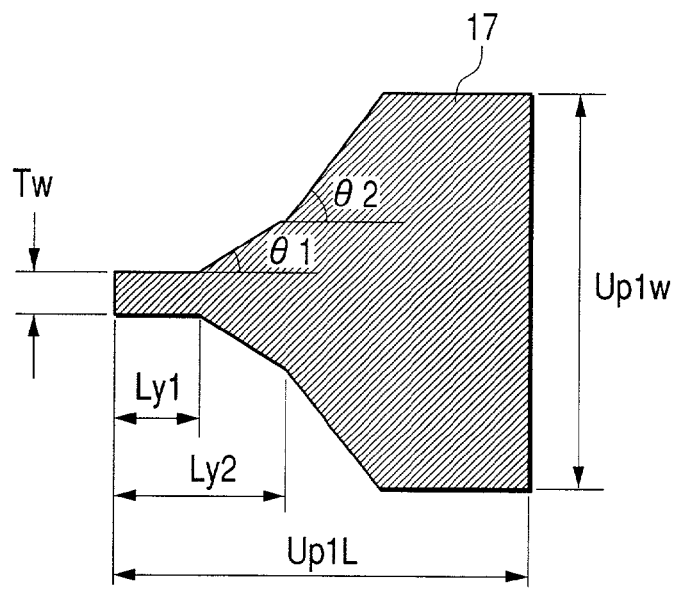
FIG. 6 is a plan view showing the shape of an upper magnetic pole front end layer of the thin film head of the present invention.

As in the plane shape of the upper magnetic pole front end layer shown in FIG. 6, using the two or more expansion angles and Ly of the upper magnetic pole front end layer, there is provided a two-stage shape in which an expansion angle θ2 in an expansion position Ly2 of the head rear portion side is larger than an expansion angle θ1 of an expansion position Ly1 of the head front end side. The reduction of the magnetic field intensity can be released. The processing accuracy in the vicinity of the Ly1 for determining the track width can be enhanced. As such an example, the curve (b) of FIG. 17 shows the change of the magnetic field intensity with θ1 when Ly1=0.8 µm, Ly2=1.3 µm, and θ2 is 45°. The two-stage shape can increase the magnetic field intensity in the small region at θ1. As a result, the minimum value capable of using the expansion angle θ1 of the head front end side can be reduced to 10°.

Figure 18:
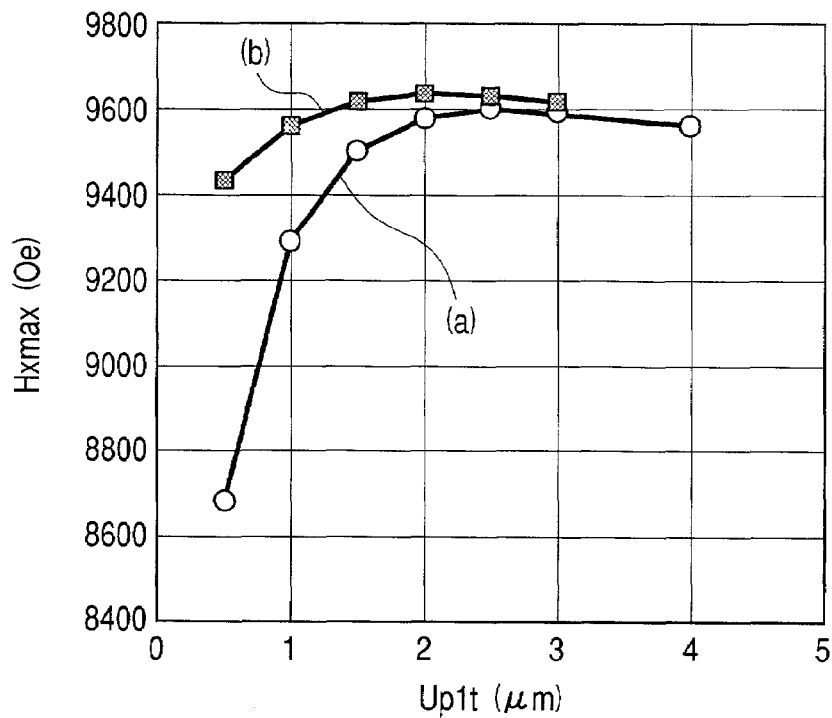
FIG. 18 is a diagram showing the relation between the recording magnetic field intensity Hxmax and the thickness Up1t of an upper magnetic pole front end layer of the thin film head of the present invention.

FIG. 18 shows the change of the magnetic field intensity with the film thickness Up1t of the upper magnetic pole front end layer. The height Lp2h of the lower magnetic pole front end portion is 1.4 µm. The curve (a) of FIG. 18 shows the case that the depth Up2d of the upper magnetic pole is 1 µm, and the curve (b) thereof shows the case that the Up2d is 0.5 µm. Other shapes are the same as those of FIG. 11. As shown in the curve (a), when the Up2d is 1 µm, with increase of the film thickness Up1t of the upper magnetic pole front end layer, the magnetic field intensity is increased abruptly and is maximum at the film thickness of 2 to 3 µm. Thereafter the magnetic field intensity is decreased gradually. When the Up2d is 0.5 µm, decrease of the magnetic field intensity is less in the region having the small Up1t. The magnetic field is reduced in the region having the small film thickness; it is considered that the magnetic path width is reduced when the magnetic flux from the upper magnetic pole top layer is transmitted in the vicinity of the recording gap of the front end of the head. The magnetic field is reduced in the region having the large film thickness; it is considered that when the film thickness is too large, the distance between the upper magnetic pole top layer and the portion in the vicinity of the recording gap of the front end of the head is long so as to increase the magnetic path length. When the Up2d is small, the distance between the upper magnetic pole top layer and the recording gap of the front end of the head is short so as to increase the magnetic field intensity.

As shown in the drawing, to obtain a high magnetic field intensity, the film thickness Up1t of the upper magnetic pole front end layer is 0.5 µm or more, desirably, 1 µm or more. When the Up2d is small, a high magnetic field can be obtained when the Up1t is less than 0.5 µm. When the Up1t is less than 0.5 µm, the change of the magnetic field intensity by film thickness variation is large. The Up1t is desirably 0.5 µm or more. When the Up1t exceeds 4 µm, the magnetic field intensity starts to be reduced. The Up1t is desirably 4 µm or less.

The film thickness of the upper magnetic pole front end layer affects not only the magnetic field intensity but also the track width accuracy. When the upper magnetic pole front end layer is thick, the resist for forming the upper magnetic pole front end layer must be also thick. When the resist is thick, the scattering of light in the resist is increased to reduce the resolution. The track width accuracy is also lowered. The magnetic field intensity is ensured, and in order to enhance the track width accuracy, the film thickness Up1$t$ of the upper magnetic pole front end layer is more preferably 3 µm or less.

In the above-mentioned example, there is described the magnetic field intensity when the entire upper magnetic pole front end layer is constructed by CoNiFe of 2.0T. As described above, in the thin film head of the present invention, basically, the upper magnetic pole front end layer 17, the upper magnetic pole rear end layer 18, and the second non-magnetic insulating layer 19 are formed. Then, these surfaces are flattened by polishing. The upper layer coils 8', the coil insulating layer 7, and the upper magnetic pole top layer 20 are formed. When the upper magnetic pole front end layer 17 is polished and a CoNiFe plated film having a high saturation magnetic flux density is used as the upper magnetic pole front end layer, the corrosion resistance of this film is low, so that corrosion may occur to the polishing liquid. To prevent corrosion of CoNiFe for such polishing, the upper magnetic pole front end layer is of a two-layer construction so that a 46Ni—Fe film is laminated on the CoNiFe film. The CoNiFe film cannot be exposed during polishing.

Figure 19:
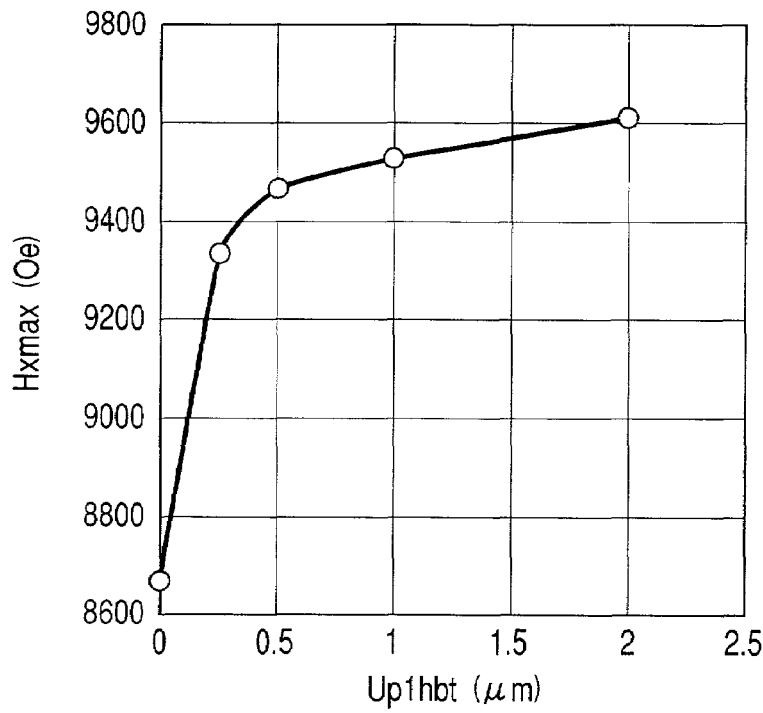
FIG. 19 is a diagram showing the relation between the recording magnetic field intensity Hxmax and the thickness of a high Bs layer of an upper magnetic pole front end layer at the recording gap side of the thin film head of the present invention.

FIG. 19 shows the change of magnetic field intensity with the film thickness Up1$hbt$ of the high Bs film of the recording gap side in the case of using a multi-layered film in which a side adjacent to the recording gap layer of the upper magnetic pole front end layer is a magnetic film of 2.0 T, and a side adjacent to the upper magnetic pole top layer is a magnetic film of 1.68 T. The film thickness Up1$t$ of the entire upper magnetic pole front end layer is 2 µm, and the height Lp2$h$ of the lower magnetic pole front end portion is 1.4 µm. Other shapes are the same as those of FIG. 11. As shown in the drawing, with increase of the Up1$hbt$, the magnetic field intensity is increased abruptly, which is then increased gently at the Up1$hbt$ of 0.5 µm or more. When the upper magnetic pole front end layer is a multi-layered film of a high Bs film and a lower Bs film, the film thickness of the high Bs film of the recording gap side is 0.2 µm or more to obtain a high magnetic field. When the Up1$hbt$ is less than 0.5 µm, the magnetic field intensity is reduced significantly with the film thickness, and it is preferably 0.5 µm or more.

Figure 20:
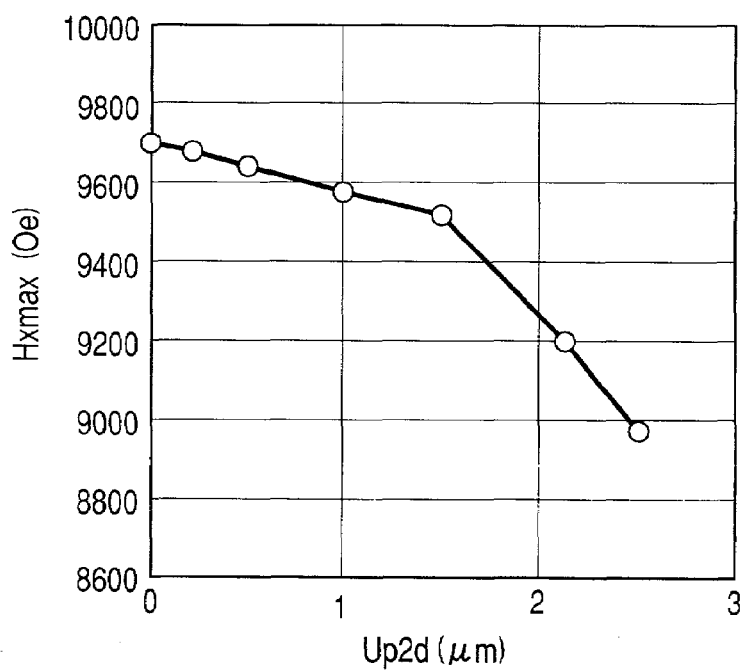
FIG. 20 is a diagram showing the relation between the recording magnetic field intensity Hxmax and the distance Up2d from a floating surface to the front end of an upper magnetic pole top layer of the thin film head of the present invention.

FIG. 20 shows the change of the magnetic field intensity with the distance between the floating surface and the front end of the upper magnetic pole top layer, that is, with the depth Up2$d$ of the upper magnetic pole top layer. The height Lp2$h$ of the lower magnetic pole front end portion is 1.4 µm. Other shapes are the same as those of FIG. 11. With increase of the Up2$d$, the magnetic field intensity is decreased gradually, and is reduced largely at the Up2$d$ of 1.5 µm or more. As described above, the Up2$d$ may be decreased to enhance the magnetic field intensity. When the Up2$d$ is too small, the leakage field from the end portion of the upper magnetic pole top layer can erase or decay a recording signal of the medium. When the Up2$d$ is 0.2 µm, the leakage field generated from the end portion of the upper magnetic pole top layer is below 1500 Oe in the medium center position (25 nm from the floating surface). When Up2$d$=0, that is, the front end of the upper magnetic pole top layer is exposed from the floating surface, the leakage field reaches 3000 Oe. Some media used can erase or decay a signal recorded onto the medium. The Up2$d$ is 0.2 µm or more to avoid the foregoing problem. When the Up2$d$ is increased, the magnetic field intensity is decreased, so that the Up2$d$ is 2 µm or less, preferably, 1.5 µm or less.

In FIG. 20, with increase of the Up2$d$, the magnetic field intensity is decreased, because the contact length Lc of the upper magnetic pole top layer and the upper magnetic pole front end layer is short. The contact length Lc corresponds to a difference between the length Up1$L$ of the upper magnetic pole and the depth Up2$d$ of the upper magnetic pole top layer shown in FIG. 1.

Figure 21:
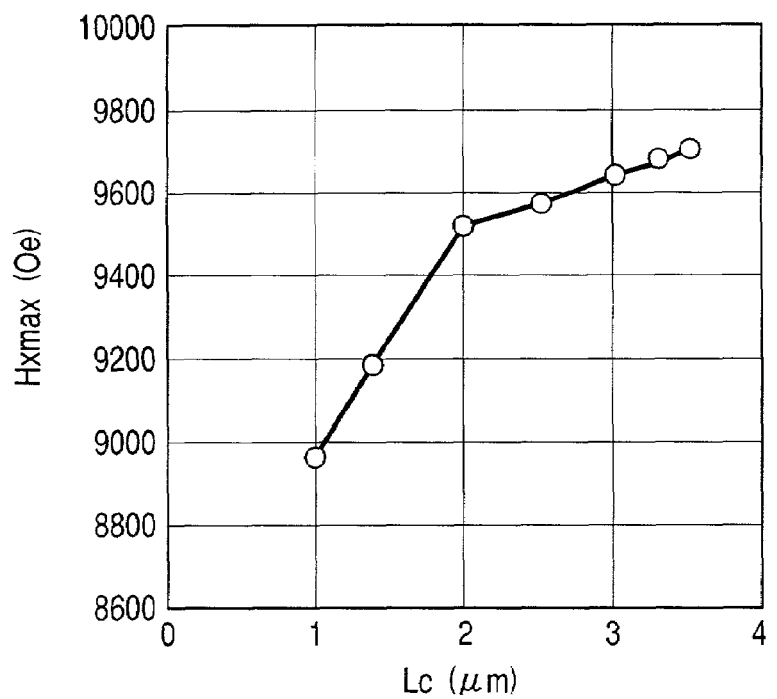
FIG. 21 is a diagram showing the relation between the recording magnetic field intensity Hxmax and the contact length Lc of an upper magnetic pole front end layer and an upper magnetic pole top layer of the thin film head of the present invention.

FIG. 21 shows the change of the magnetic field intensity with the contact length Lc of the upper magnetic pole front end layer and the upper magnetic pole top layer. As shown in the drawing, with the contact length Lc, the magnetic field intensity is increased abruptly, and is increased gently at the Lc of 2 µm or more. To obtain a high magnetic field intensity, the Lc must be 1.5 µm or more. When the Lc is less than 2 µm, the change of the magnetic field with the Lc is large. The Lc is preferably 2 µm or more.

The length Up1$L$ of the upper magnetic pole front end layer and the rising position Up2$s$ of the upper magnetic pole top layer are increased so that the contact length Lc can be long. In such a case, the distance between the gap depth and a back contact position Bc for contacting the upper magnetic pole rear end layer, the lower magnetic pole rear end portion and the lower magnetic pole is long, thereby increasing the magnetic path length of the entire head. The changing rate of the magnetic field is low so as to deteriorate the recording characteristics at a high frequency.

The Up1$L$ is 5 µm or less, preferably, 4 µm or less so as to ensure the contact length Lc. A difference between the rising position Up2$s$ of the upper magnetic pole top layer and the Up1$L$ (Up2$s$ Up1$L$ ) is desirably 0 to 1.5 µm, so that when the alignment of the upper magnetic pole top layer and the upper magnetic pole front end layer is shifted, the contact length Lc can be ensured.

Figure 22:
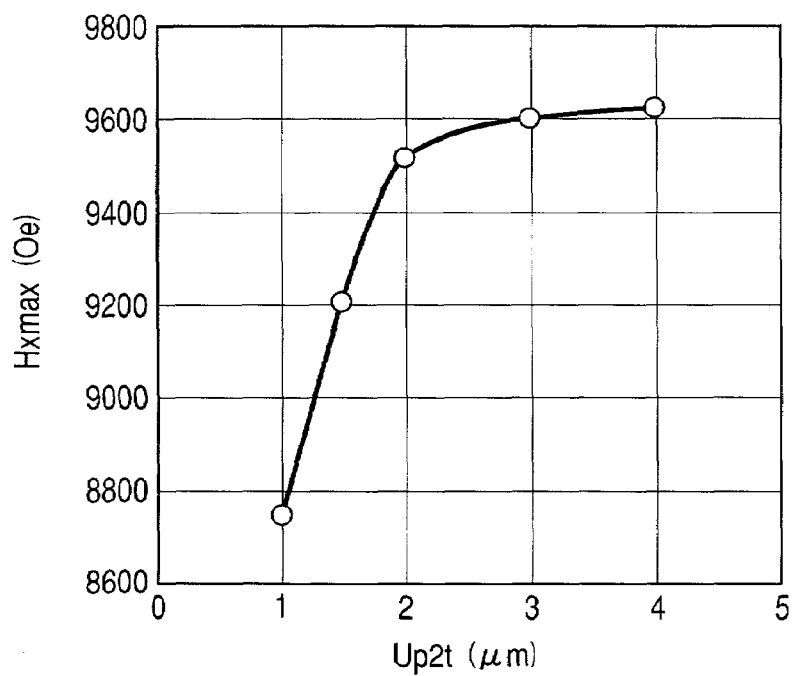
FIG. 22 is a diagram showing the relation between the recording magnetic field intensity Hxmax and the thickness Up2t of an upper magnetic pole top layer of the thin film head of the present invention.

FIG. 22 shows the change of the magnetic field intensity with the film thickness Up2$t$ of the upper magnetic pole top layer. The height Lp2$h$ of the lower magnetic pole front end portion is 1.4 µm. Other shapes are the same as those of FIG. 11. As shown in the drawing, with the film thickness Up2$t$ of the upper magnetic pole top layer, the magnetic field intensity is increased abruptly, and the increase is saturated at the Up2$t$ of 2 µm or more. To obtain a high magnetic field intensity, the Up2$t$ must be 1.5 µm or more. On the other hand, to obtain a stable magnetic field intensity to the variation of the Up2$t$, the Up2$t$ is desirably 2 µm or more. When the Up2$t$ is too large, the magnetic field intensity at a high frequency tends to be reduced by the overcurrent effect. The Up2$t$ is desirably 4 µm or less.

As described above, in the thin film head of the present invention, the lower magnetic pole front end portion is provided to select its shape. A recording magnetic field higher than that of the prior art thin film head can be obtained. The photoresist for producing the upper magnetic pole front end layer can be formed on the flat surface of the lower magnetic pole front end portion. The processing accuracy of the small track width can be enhanced.

Embodiment 2

As described in Embodiment 1, the thin film head of the present invention can realize a high recording magnetic field. When the recording magnetic field is very high in the thin film head of the present invention, the medium in-plane magnetic field is found to be increased in the position away from the center of the track to the outside of the track end portion in the track width direction (the off-track position). The medium in-plane magnetic field refers to a vector sum Hxz of the magnetic field component in the recording medium running direction and the magnetic field component in the track width direction. When the medium in-plane magnetic field in the off-track position is large, the signal of the adjacent track recorded onto the medium can be erased or decayed. The medium in-plane magnetic field in the off-track position is desirably as small as possible. The second embodiment of the present invention proposes a construction for reducing the medium in-plane magnetic field in the off-track position.

FIG. 7 shows a perspective view of the front end portion of the thin film head of the second embodiment of the present invention. In the thin film head of Embodiment 1, it is considered that the leakage flux from the upper magnetic pole front end layer is concentrated in the vicinity of the end portion of the floating surface of the lower magnetic pole front end portion, thereby increasing the medium in-plane magnetic field in the off-track position. To reduce this, in the second embodiment, a projection step portion 29 for absorbing the leakage flux is provided on the lower magnetic pole front end portion 23. In the drawing, the width of the projection step portion 29 from the upper magnetic pole front end layer is Stw, and the starting position of the projection step portion 29 from the floating surface is Std.

Figure 23:
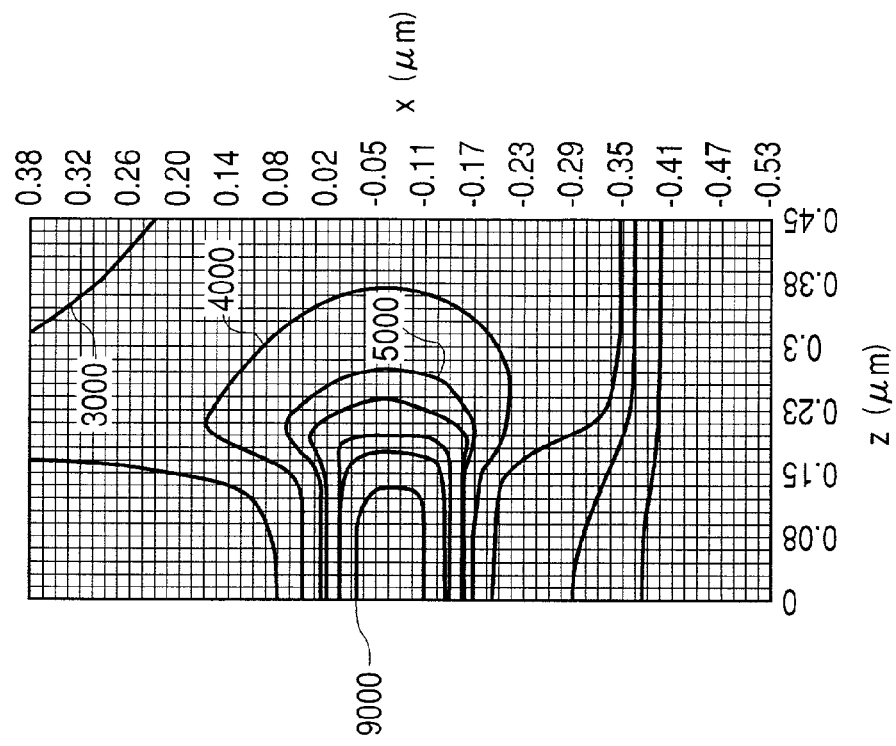
FIG. 23 is a diagram showing the distribution of medium in-plane magnetic field Hxz of the thin film head of the present invention.
Figure 24:
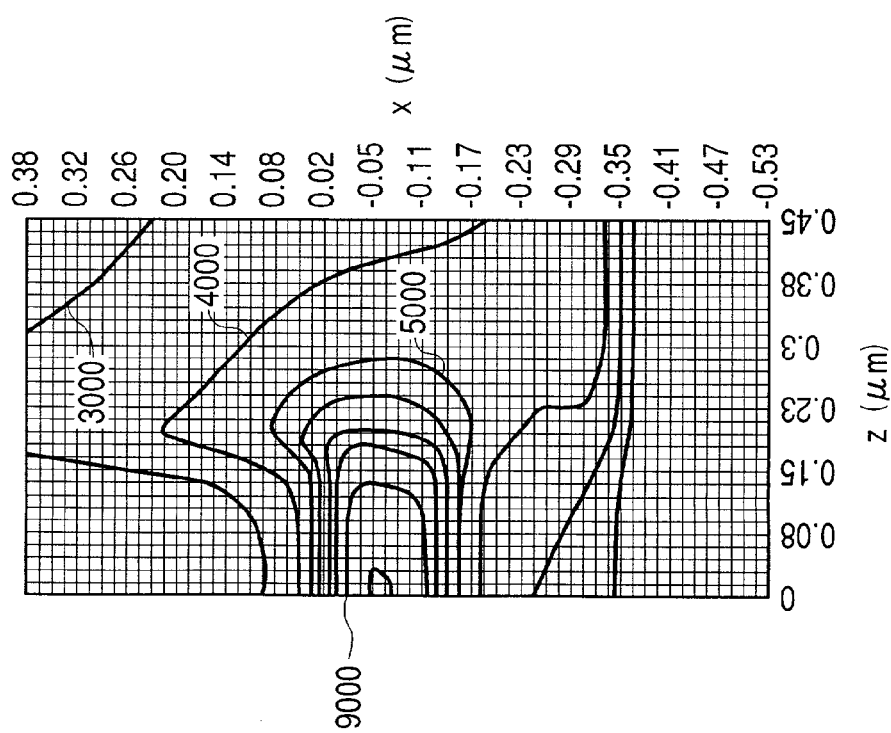
FIG. 24 is a diagram showing another example of the distribution of medium in-plane magnetic field Hxz of the thin film head of the present invention.

FIG. 23 shows the comparison of the medium in-plane magnetic field Hxz in the case that the Stw of the projection step portion 29 is zero in the lower magnetic pole front end portion (which corresponds to the absence of a portion larger than the width of the upper magnetic pole in the projection step portion 29). FIG. 24 shows the comparison of the medium in-plane magnetic field Hxz in the case that the Stw of the projection step portion 29 is not zero in the lower magnetic pole front end portion (which corresponds to the presence of a portion larger than the width of the upper magnetic pole in the projection step portion 29. In this example, Stw=3.8 μm).

In these examples, Ly=0.5 μm, Std=0.5 μm, Lp2h=1.4 μm, and other conditions are the same as those of FIG. 11. The drawing shows the magnetic field distribution in the medium in-plane direction Hxz in the position corresponding to the center of the medium when the head is viewed from the floating surface (25 nm from the floating surface), in which the right half from the track center z=0 of the head is shown. The horizontal axis z shows a position from the track center. Z=0 to 0.175 μm indicates a track width, and above z=0.175 μm indicates an off-track position. The vertical axis x shows a position in the medium running direction. Below x=−0.13 μm indicates the lower magnetic pole front end portion, x=−0.13 to 0 μm indicates the recording gap, and above x=0 indicates the upper magnetic pole front end layer.

As shown in FIG. 23, when the Stw of the projection step portion 29 is 0, the in-plane magnetic field component Hxz of z=0.45 μm largely away from the end portion of the track (z=0.175) exceeds 4000 Oe. Some media used can erase or decay a signal recording onto the adjacent track.

When the Stw of the projection step portion 29 is not 0 (in this case, Stw=3.8 μm), as shown in FIG. 24, the in-plane magnetic field component of z=0.45 μm is lowered to below about 4000 Oe to reduce the influence onto the adjacent track.

Figure 25:
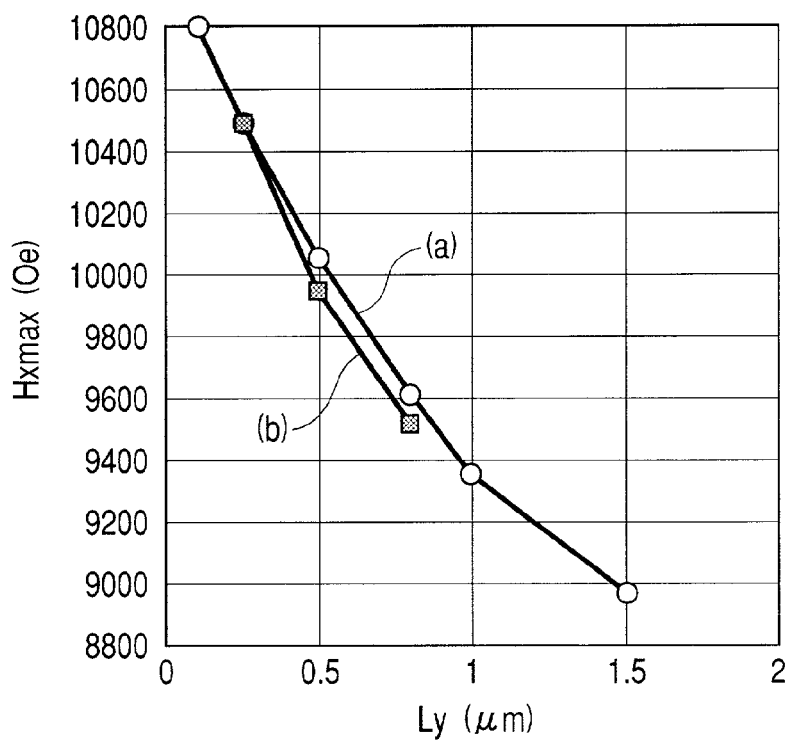
FIG. 25 is a diagram showing the relation between the recording magnetic field intensity Hxmax and the magnetic pole extension position Ly of an upper magnetic pole front end layer, i.e., the magnetic pole contraction position of the thin film head of the present invention by comparing the presence of a projection step portion with the absence thereof.
Figure 26:
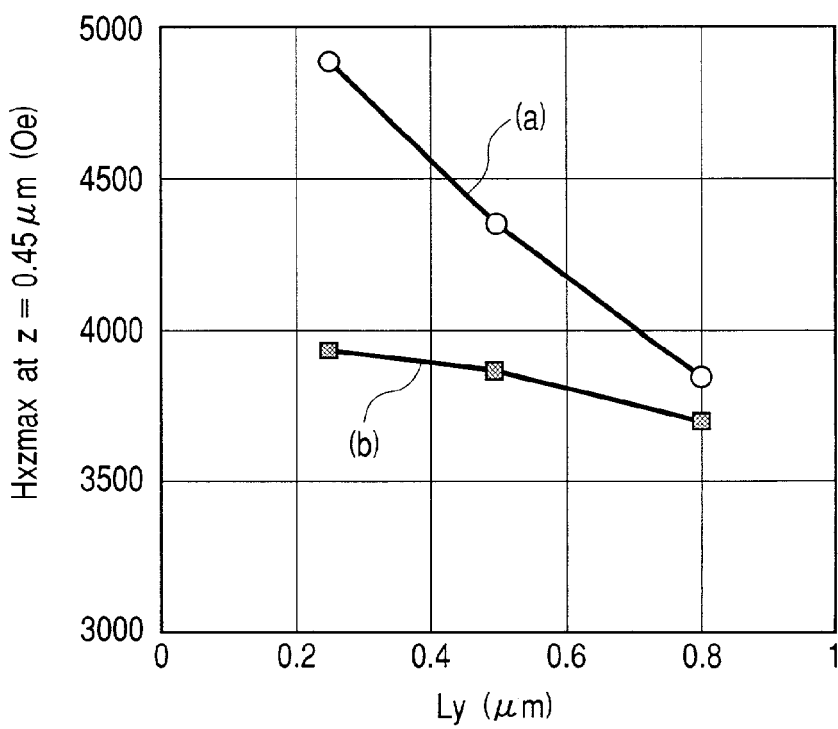
FIG. 26 is a diagram showing the relation between the magnetic pole expansion position Ly of an upper magnetic pole front end layer and the medium in-plane magnetic field Hxzmax in the off-track position of the thin film head of the present invention.

In the case that the Stw of the projection step portion 29 is not 0 or is 0, FIG. 25 shows the change of the magnetic field intensity Hxmax at the center of the track width when the magnetic pole expansion position of the upper magnetic pole front end layer, that is, the upper magnetic pole contraction position Ly is changed; and FIG. 26 shows the change of the maximum value Hxzmax at z=0.45 μm of the medium in-plane magnetic field with the magnetic pole expansion position Ly of the upper magnetic pole front end layer. The curve (a) shows the case that the Stw of the projection step portion 29 is 0, and the curve (b) shows the case that the Stw of the projection step portion 29 is not 0. Std=Ly, and other conditions are the same as those of FIG. 23. As shown in FIG. 25, as compared with the magnetic field intensity of the center of the track width, the magnetic field intensity is reduced by below 100 Oe when the Stw of the projection step portion 29 is not 0. The influence onto the center magnetic field due to the projection step portion 29 provision is small. As shown in FIG. 26, the medium in-plane magnetic field Hxmax at z=0.45 μm can be reduced largely by the projection step portion 29 provision as described above. In particular, the effect is significant in a small region of Ly having a high center magnetic field.

Figure 27:
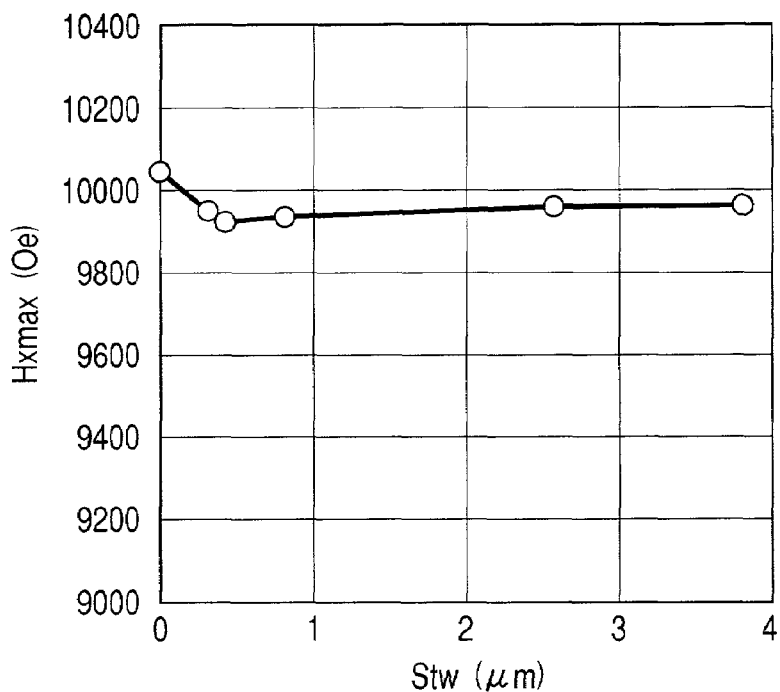
FIG. 27 is a diagram showing the relation between the recording magnetic field intensity Hxmax and the width Stw of a projection step portion on a lower magnetic pole front end portion of the thin film head of the present invention.
Figure 28:
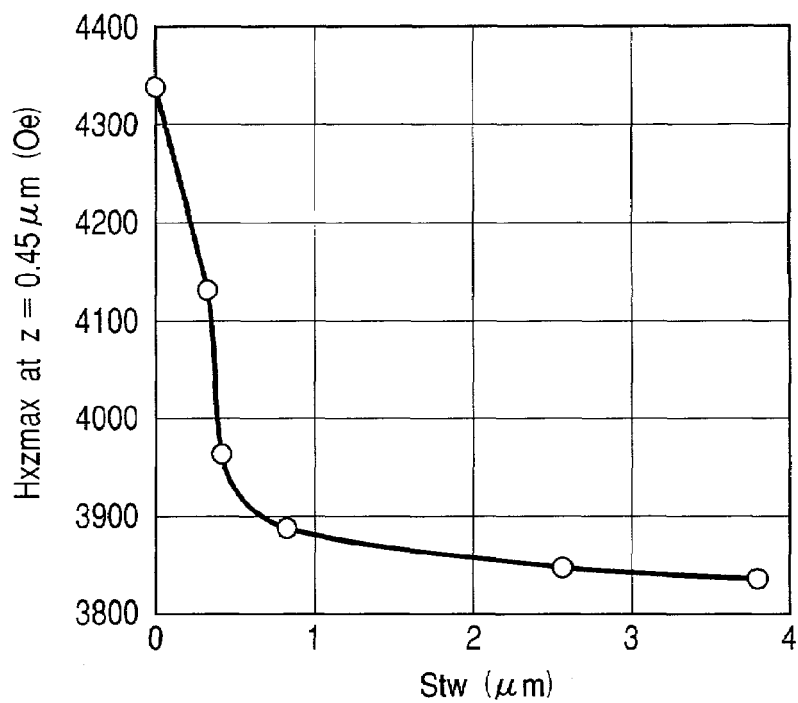
FIG. 28 is a diagram showing the relation between the width Stw of a projection step portion on a lower magnetic pole front end portion and the medium in-plane magnetic field Hxzmax in the off-track position of the thin film head of the present invention.

FIG. 27 shows the change of the center magnetic field intensity Hxmax with the width Stw of the projection step portion 29. FIG. 28 shows the change of the maximum value Hxmax of the medium in-plane magnetic field at z=0.45 μm with the width Stw of the projection step portion 29. Ly=Std=0.5 μm, and other conditions are the same as those of FIG. 25. In the drawings, Stw=0 corresponds to the absence of a portion larger than the width of the upper magnetic pole in the projection step portion 29. As shown in FIG. 27, the Stw hardly changes the center magnetic field. As shown in FIG. 28, the medium in-plane magnetic field at z=0.45 μm is increased when the Stw is less than 0.5 μm, so that the effect of the projection step portion 29 provision is reduced. The width Stw of the projection step portion 29 must be 0.5 μm or more.

Figure 29:
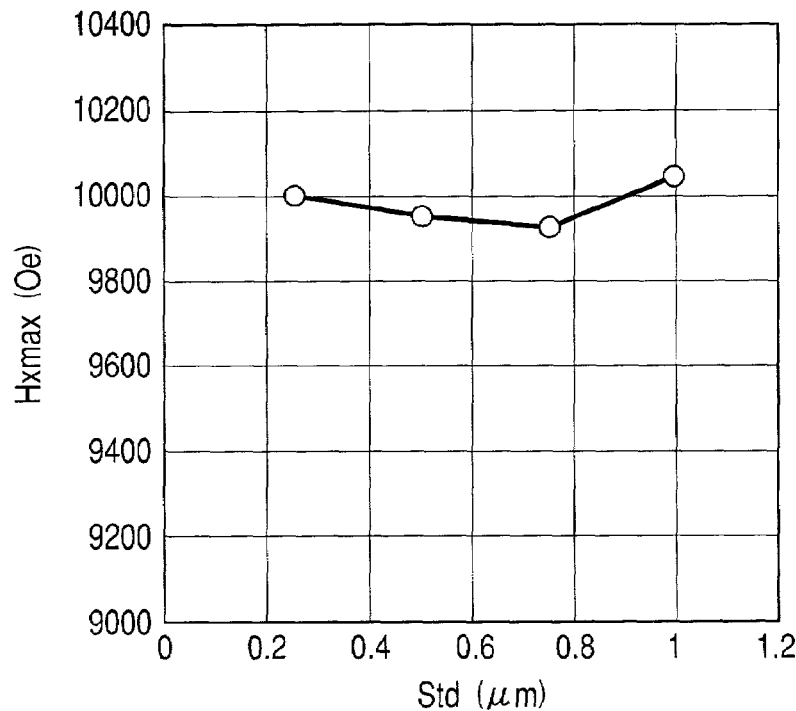
FIG. 29 is a diagram showing the relation between the recording magnetic field intensity Hxmax and the starting position Std of a projection step portion on a lower magnetic pole front end portion of the thin film head of the present invention.
Figure 30:
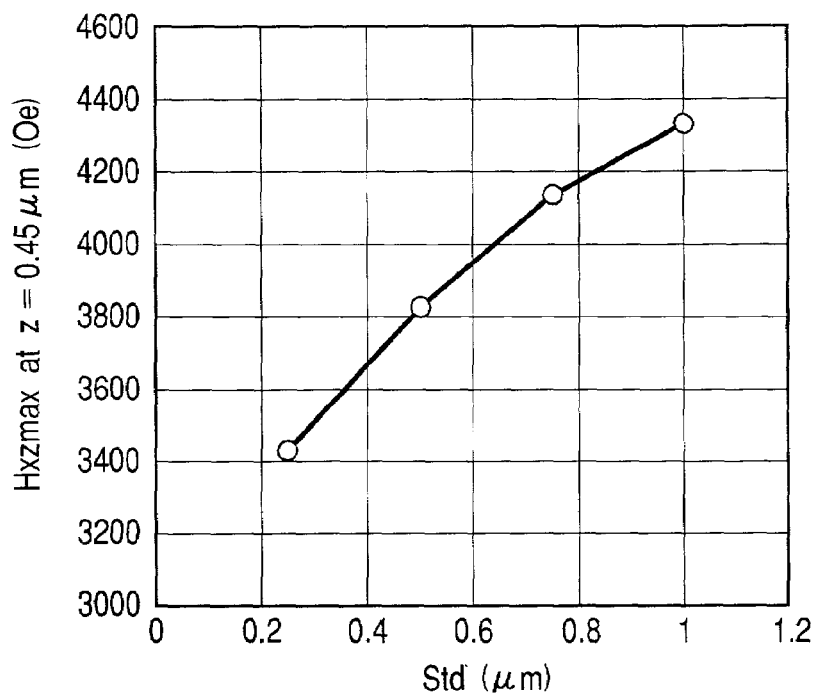
FIG. 30 is a diagram showing the relation between the starting position Std of a projection step portion on a lower magnetic pole front end portion and the medium in-plane magnetic field Hxzmax in the off-track position of the thin film head of the present invention.

FIG. 29 shows the change of the center magnetic field Hxmax with the distance Std between the starting position of the projection step portion 29 on the lower magnetic pole front end portion and the floating surface. FIG. 30 shows the change of the maximum value Hxzmax of the medium in-plane magnetic field at z=0.45 μm with the distance Std between the starting position of the projection step portion 29 on the lower magnetic pole front end portion and the floating surface. The Stw is 3.8 μm, and other conditions are the same as those of FIGS. 27 and 28. Since Gd=1, Std=1 corresponds to the case of the absence of the projection step portion 29. As shown in FIG. 29, the center magnetic field is increased slightly with decrease of the Std. On the other hand, the medium in-plane magnetic field at z=0.45 μm is decreased with decrease of the Std. Therefore, as a portion larger than the width of the upper magnetic pole is provided in the projection step portion 29, at any Std, the medium in-plane magnetic field in the off-track position is reduced. The effect that the starting position Std of the projection step portion is below the Ly is high and more preferable. When the Std is too small, the effect of trimming is reduced so as to increase the medium in-plane magnetic field in the off-track position. The Std is desirably 0.1 μm or more.

There are some methods for forming the projection step portion 29 in this embodiment. For example, after the lower magnetic pole front end portion 23, the recording gap layer 6, and the upper magnetic pole front end layer 17 are formed, the unnecessary portion of the lower magnetic pole front end portion is removed by FIB (focused ion beam), whereby track trimming and corresponding to the projection step portion 27 shown in FIG. 1 and the projection step portion 29 can be formed at the same time. In addition, after the upper magnetic pole front end layer 17 is formed, a protective resist is formed in a portion to be the projection step portion 29 on the lower magnetic pole front end portion on the lower magnetic pole front end portion, so that using the protective resist as a mask, the unnecessary portion is removed by ion milling, thereby forming track trimming and the projection step portion 29.

In the thin film head of the present invention, the projection step portion 29 on the lower magnetic pole front end portion is formed by removing the lower magnetic pole front end portion except for the track width as in the prior art trimming. The projection step portion 29 appears to be similar to the prior art track trimming. The prior art track trimming is processed by ion milling using the upper magnetic pole front end layer as a mask so as to be formed in almost the same shape of that of the upper magnetic pole front end layer. The projection step portion 29 of the present invention, as shown in FIG. 7, has a width larger than the upper magnetic pole front end layer at least in the head rear portion from the floating surface, so as to absorb the leakage flux from the upper magnetic pole front end layer in a portion larger than the upper magnetic pole front end layer.

Figure 8A:
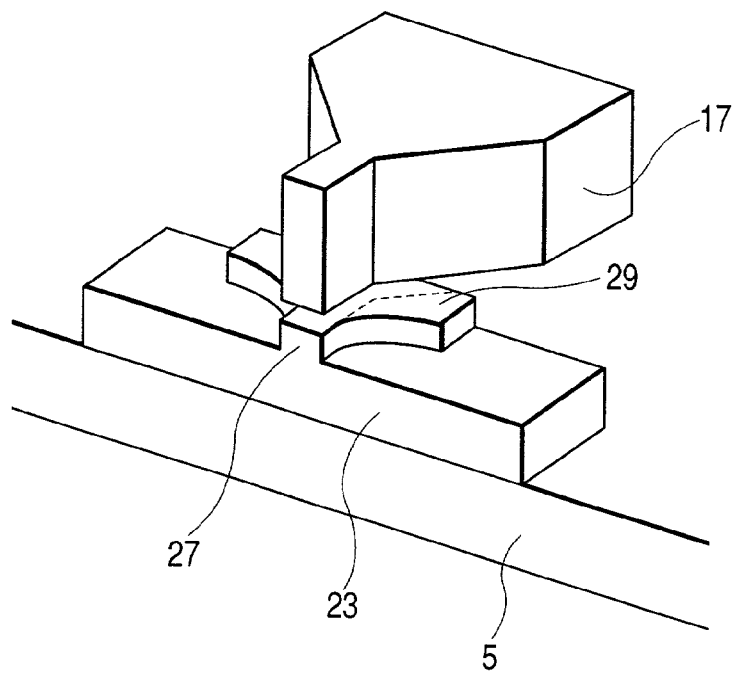
FIG. 8 is a perspective view showing the shape of a projection step portion provided on a lower magnetic pole front end portion on a lower magnetic pole main layer of a further embodiment of the thin film head of the present invention as well as the shape of an upper magnetic pole front end portion.
Figure 8B:
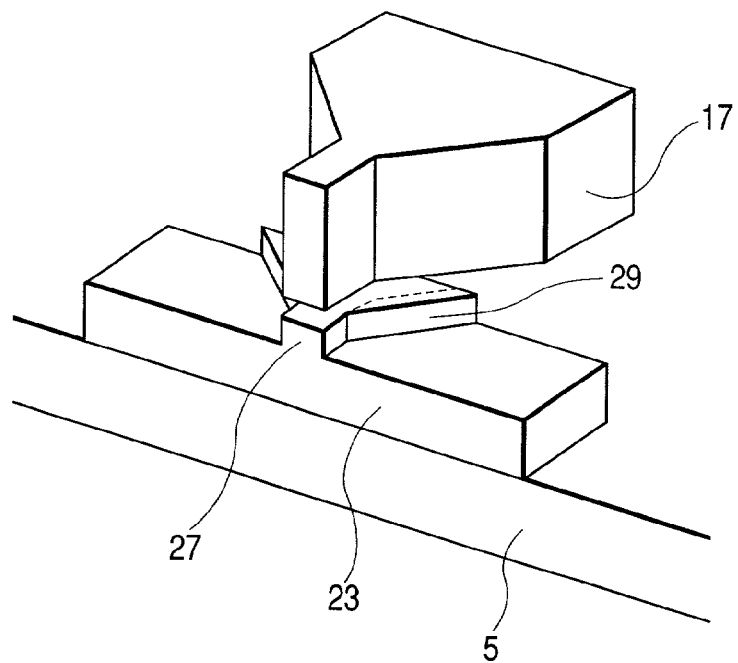

As shown in FIG. 8, various shapes are possible as the shape of the projection step portion larger than the upper magnetic pole front end layer, so as to provide the effect of reducing the medium in-plane magnetic field in the off-track position. The height of the projection step portion 29 is almost equal to the trim depth Tr. However, it is possible to provide the effect when the height of the projection step portion 29 is smaller than the trim depth Tr.

Embodiment 3

In Embodiments 1 and 2, the example in which the track width is 0.35 μm is described. When the track width has a value other than the above-mentioned value, the dimensions of the respective parts of the head are changed in proportion to the track width. The change of the magnetic field intensity is found to be the same as in Embodiments 1 and 2. The selection range of the dimensions of the respective parts when the track width Tr is changed is as follows.

(a) The ratio $Lp2h/Tw$ of the height $Lp2h$ of the lower magnetic pole front end portion to the track width Tw is 0.9 or more, more preferably, 2 or more.

(b) The ratio $Lp2w/Tw$ of the width $Lp2w$ of the lower magnetic pole front end portion to the track width Tw is 2.9 or more, more preferably, 8.6 or more.

(c) The ratio Gd/Tw of the gap depth Gd to the track width Tw is 0.9 to 5.7.

(d) The ratio Tr/Tw of the trim depth Tr to the track width Tw is 0.29 to 1.15.

(e) The ratio Ly/Tw of the magnetic pole expansion position Ly to the track width Tw is 0.6 to 4.3.

(f) The ratio $Up1t/Tw$ of the film thickness $Up1t$ of the upper magnetic pole front end layer to the track width Tw is 1.4 to 11.4, more preferably 2.9 to 8.6.

(g) The ratio $Up1hbt/Tw$ of the high Bs film thickness $Up1hbt$ of the upper magnetic pole front end layer to the track width Tw is 0.6 or more, more preferably, 1.4 or more.

(h) The ratio $Up2d/Tw$ of the depth $Up2d$ of the upper magnetic pole top layer to the track width Tw is 0.6 to 5.7, more preferably, 0.6 to 4.3.

(i) The ratio Lc/Tw of the contact length Ic of the upper magnetic pole top layer and the upper magnetic pole front end layer to the track width Tw is 4.3 or more, more preferably, 5.7 or more.

(j) The ratio $Up1L/Tw$ of the length $Up1L$ of the upper magnetic pole top layer to the track width Tw is 14.3 or less, more preferably, 11.4 or less.

(k) The ratio $Up2t/Tw$ of the film thickness $Up2t$ of the upper magnetic pole top layer to the track width Tw is 4.3 to 11.4, more preferably, 5.7 to 11.4.

(l) The ratio Stw/Tw of the width Stw of the projection step portion on the upper magnetic pole front end layer to the track width Tw is 1.4 or more.

(m) The ratio of the starting position Std of the projection step portion on the upper magnetic pole front end layer to the track width Tw is 0.3 or more.

By using the shapes described above, as in Embodiments 1 and 2, it is possible to obtain a thin film head having a high track width accuracy, a high recording magnetic field intensity, and a small medium in-plane magnetic field in the off-track position.

Figure 9:
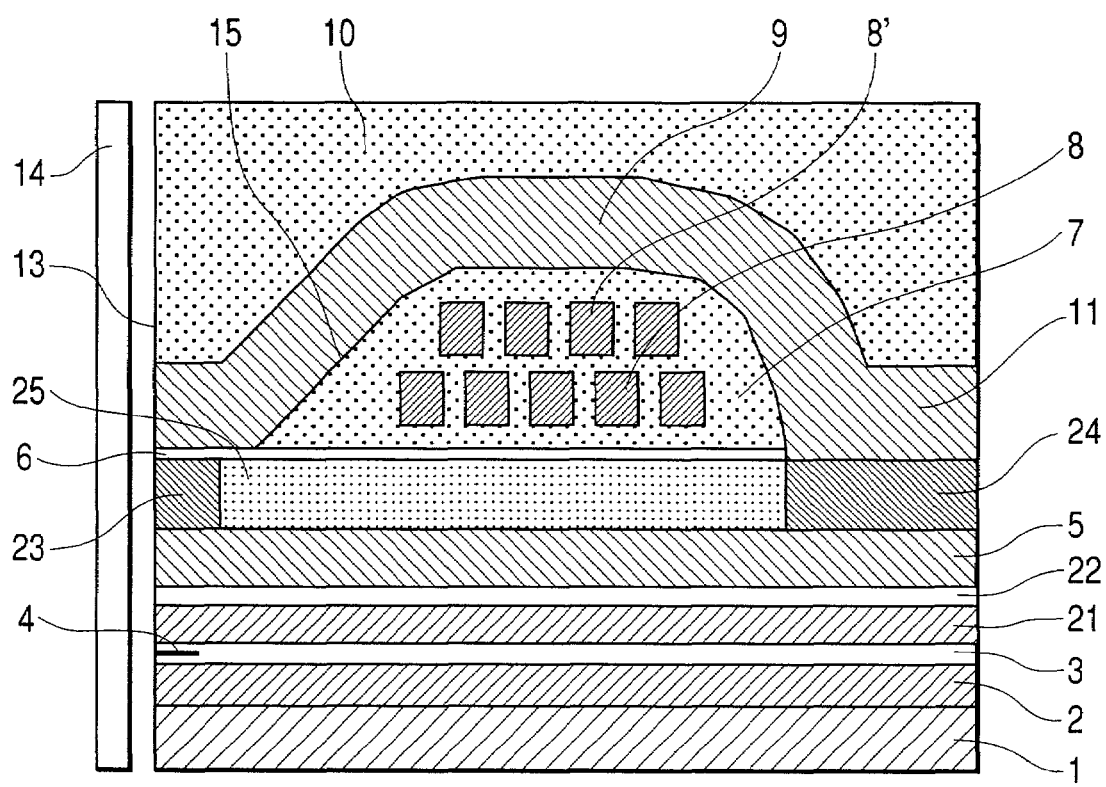
FIG. 9 is a cross-sectional view of another embodiment of the thin film head of the present invention.

In the thin film head of the present invention shown in Embodiments 1, 2 and 3, as shown in FIG. 2, the example in which the upper magnetic pole front end layer is provided. As shown in FIG. 9, the head not using the upper magnetic pole front end layer is combined with the lower magnetic pole front end portion 23 to provide the same effect. In this case, the upper magnetic pole front end layer 17 corresponds to the upper magnetic pole front end portion of FIG. 9.

Figure 10A:
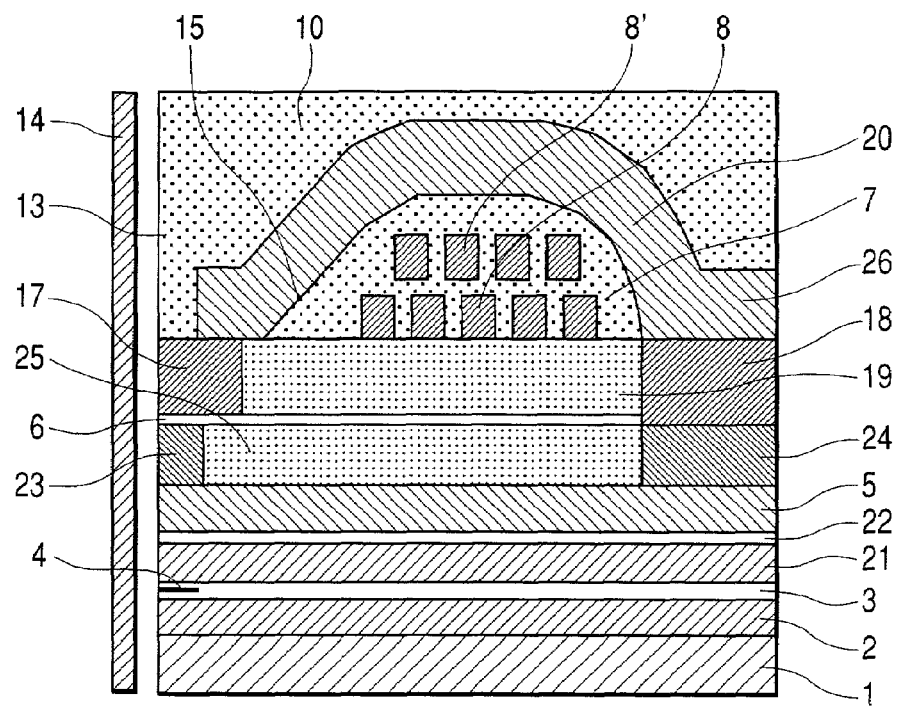
FIG. 10 is a cross-sectional view of a further embodiment of the thin film head of the present invention.

In addition, in the thin film head of the present invention shown in Embodiments 1, 2 and 3, as shown in FIG. 2, the lower layer coils 8 are disposed between the upper magnetic pole front end layer 17 and the upper magnetic pole rear end layer 18 so as to be arranged circumferentially about the upper magnetic pole rear end layer 18. However, as shown in FIG. 10(a), both the lower layer coils 8 and the upper layer coils 8' may be disposed in the coil insulating layer 7 so as to be arranged circumferentially about the rear end portion 26 of the upper magnetic pole top layer.

Figure 10B:
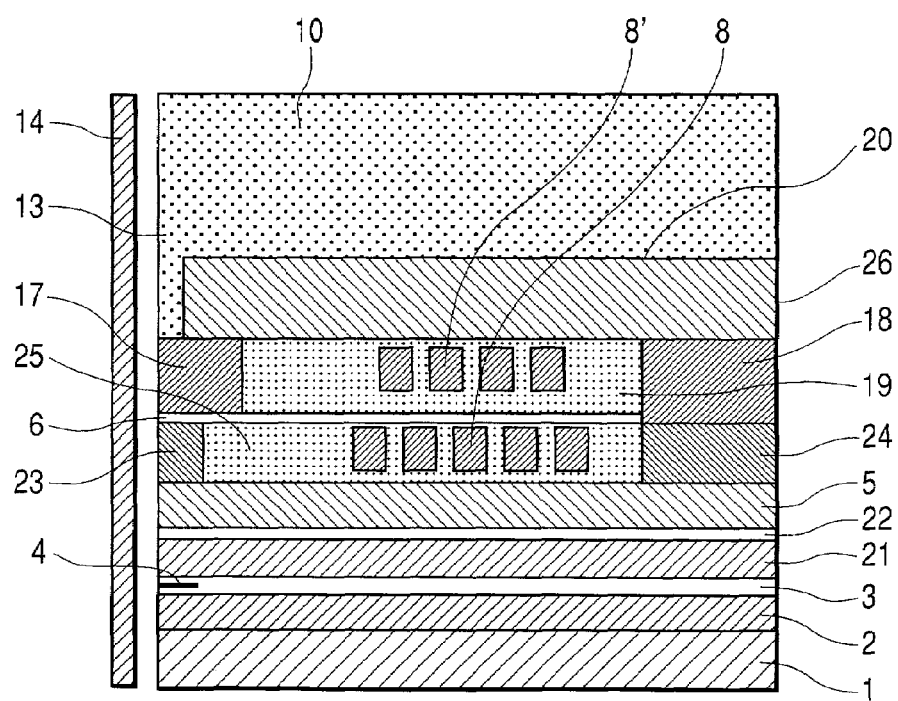

As shown in FIG. 10(b), the lower layer coils 8 may be disposed between the lower magnetic pole front end portion 23 and the lower magnetic pole rear end portion 24 so as to be arranged circumferentially about the lower magnetic pole rear end portion 24, and the upper layer coils 8' may be disposed between the upper magnetic pole front end layer 17 and the upper magnetic pole rear end layer 18 so as to be arranged circumferentially about the upper magnetic pole rear end layer 18. The construction of FIG. 2 may house only the upper layer coils 8' in the coil insulating layer 10. The construction of FIG. 2 can reduce the height of the upper magnetic pole rear end layer 18 so as to decrease the magnetic path length of the entire head. As compared with the construction of FIG. 10(a), the construction of FIG. 2 can increase the magnetic field rising rate at a high frequency so as to enhance the recording characteristics at a high frequency.

In the construction of FIG. 10(b), the coil insulating layer 7 is unnecessary so as to reduce the magnetic path length of the entire head. In the above-mentioned embodiments, the coils are arranged in two layers of an upper layer and a lower layer. The coils may be arranged in one layer or three or more layers to provide the same effect.

In the above-mentioned embodiments, the CoNiFe film is described as the magnetic material for use in the lower magnetic pole front end portion and the upper magnetic pole front end layer of the thin film head of the present invention. The magnetic material is not limited thereto when it is a soft magnetic material having a high saturation magnetic flux density. For example, the magnetic material can include a 46Ni—Fe film with Bs=1.6 to 1.7 T, a CoNiFe film or a Co—Fe film with Bs=1.8 to 2.4 T, and so on.

It is possible to use not only a plated film but also a sputter film such as CoNiFe film, Co—Fe film, Co—Fe—N film, and Fe—Ta—N film. The magnetic field intensity of the thin film head of the present invention is affected greatly by the saturation magnetic flux density of the magnetic material for use in the upper magnetic pole front end layer and the lower magnetic pole front end portion. The saturation magnetic flux density of the magnetic material for use in the upper magnetic pole front end layer and the lower magnetic pole front end portion must be at least 1.6 T or more. More preferably, it is 1.8 T or more.

The 46Ni—Fe film is described as the magnetic material for use in the lower magnetic pole and the upper magnetic pole top layer of the thin film head of the present invention. The magnetic material is not limited thereto when it is a soft magnetic material having a high saturation magnetic flux density. In addition to a plated film such as a 46Ni—Fe film with Bs=1.6 to 1.7 T and an 82Ni—Fe film with Bs=1 T, it is possible to use a microcrystalline sputter film such as Fe—Ta—N film, Fe—Ta—N film, and Fe—Ta—C film with Bs=1.4 to 1.6 T, or an amorphous sputter film such as Co—Zr film, Co—Ta—Zr film, and Co—Nb—Zr film with Bs=1 to 1.6 T. Naturally, the material for the upper magnetic pole front end layer and the lower magnetic pole front end portion may be used.

To increase the recording magnetic field intensity, a magnetic material having a saturation magnetic flux density at least equal to or higher than that of the lower magnetic pole main layer or the upper magnetic pole top layer is used for the upper magnetic pole front end layer and the lower magnetic pole front end portion which are respectively opposite to the recording gap. There may be provided a multi-layered construction so that a high Bs film is used for a portion of one of the lower magnetic pole front end portion and the upper magnetic pole front end layer adjacent to the recording gap or portions of both the lower magnetic pole front end portion and the upper magnetic pole front end layer adjacent to the recording gap, and a lower Bs film is used for a layer on the opposite side of the recording gap.

The magnetic material for use in the upper magnetic pole top layer and the lower magnetic pole main layer may have a saturation magnetic flux density lower than that of the magnetic material for use in the upper magnetic pole front end layer and the lower magnetic pole front end portion. To reduce eddy current to enhance the high frequency recording characteristics, the specific resistance is preferably high. For example, the CoNiFe film for use in the upper magnetic pole front end layer and the lower magnetic pole front end portion in the embodiments of the present invention has a specific resistance of 17 to 20 μΩcm. The 46Ni—Fe film for use in the upper magnetic pole top layer and the lower magnetic pole main layer has a high specific resistance of 45 to 55 μΩcm. The high specific resistance can reduce the eddy current of the upper magnetic pole top layer and the lower magnetic pole main layer which are large and susceptible to the eddy current effect, and increase the rising rate of the magnetic field at a high frequency so as to enhance the high-frequency recording characteristics. The magnetic material for use in the upper magnetic pole top layer and the lower magnetic pole main layer desirably has a specific resistance of 45 μΩcm or more.

In the thin film head of the present invention, when the lower magnetic pole front end portion and the lower magnetic pole rear end portion are formed on the lower magnetic pole main layer, basically, a photoresist is coated onto the lower magnetic pole, which is then exposed using a mask of a shape to be the lower magnetic pole front end portion and the lower magnetic pole rear end portion. Then, the resist of a shape to be the lower magnetic pole front end portion and the lower magnetic pole rear end portion is removed by development. Thereafter, the magnetic material to be the lower magnetic pole front end portion and the lower magnetic pole rear end portion is formed by a plating method; that is, it is produced by a so-called frame plating method. The shape of the lower magnetic pole front end portion can be produced accurately.

On the other hand, there is a method in which after the lower magnetic pole main layer is formed, the portion to be the lower magnetic pole front end portion is protected by a resist so as to engrave the coil portion in by ion milling. As in the present invention, to form the lower magnetic pole front end portion having a height of 0.3 to 2 μm, it takes long time for milling and the milled material is re-deposited onto other portions. Thus, this method is not used in the present invention. In the present invention, the surface for defining a gap depth of the lower magnetic pole front end portion formed by the flame plating method is formed almost perpendicular to the recording gap surface within an error of about ±10°.

In the present invention, the lower magnetic pole front end portion and the lower magnetic pole rear end portion can be produced separately using another kind of magnetic material. Basically, in view of reducing the producing process, the lower magnetic pole front end portion and the lower magnetic pole rear end portion are produced at the same time using the same kind of magnetic material.

The effect of enhancing the track width accuracy and of increasing the magnetic field in the thin film head of the present invention can be obtained in any track width. In particular, the thin film head of the present invention can exhibit an excellent effect in a region of the small track width of 0.4 μm or less in which reduction of the magnetic field intensity and the track width accuracy will be a main problem. In addition, the thin film head of the present invention can exhibit an excellent effect when incorporated into a magnetic disk apparatus using a high-coercivity recording medium of 3500 Oe or more. Further, the thin film head of the present invention can exhibit an excellent effect in a magnetic disk array apparatus incorporating a magnetic disk apparatus using the thin film head of the present invention.

As described above, in the thin film head of the present invention, the lower magnetic pole front end portion is provided on the lower magnetic pole main layer to suitably select the shape dimensions of the respective parts of the head are selected suitably. It is possible to provide a thin film head having a high track width accuracy and a high recording magnetic field intensity. The projection step portion having a width larger than that of the upper magnetic pole front end layer is provided on the lower magnetic pole front end portion. It is possible to reduce the unnecessary medium in-plane magnetic field in the off-track position. The magnetic disk apparatus and the magnetic disk array apparatus equipped with the thin film head of the present invention are combined with a medium having a coercivity of 279 kA/m (3500 Oe) or more. It is possible to realize the disk magnetic apparatus and the magnetic disk array apparatus having excellent performance.

What is claimed is:

1. A thin film head having a reading part and a recording part comprising:
    an upper magnetic pole having a first width at an air bearing surface and a second width which is larger than the first width at a first depth position from the air bearing surface;
    a lower magnetic pole having a lower magnetic main layer, and a projection step portion above the lower magnetic main layer; and
    an upper magnetic pole top layer recessed from the air bearing surface;

a first coil formed between the upper magnetic pole top layer and the lower magnetic main layer;

a first insulating layer covering the first coil;

a non-magnetic insulating layer on the lower magnetic main layer, which is formed at an opposite side to the air bearing surface;

a second insulating layer formed between the first insulating layer and the non-magnetic insulating layer;

wherein the projection step portion includes one portion which faces the upper magnetic pole, and another portion which is formed so as to extend from a second depth position from the air bearing surface to a third depth position from the air bearing surface and having a part which does not face the upper magnetic pole;

wherein the upper magnetic pole has a third width at a fourth depth position which is defined by a closest edge from the air bearing surface of the second insulating layer;

wherein the second and third depth positions are provided between the fourth depth position and the air bearing surface;

wherein a fourth width at the second depth position of the projection step portion is larger than a width in a track width direction of the projection step portion at the air bearing surface;

wherein the first, second, third and fourth width are widths in the track width direction; and wherein a distance from the air bearing surface to the second depth position is shorter than a distance from the air bearing surface to the first depth position.

2. A thin film head according to claim 1, wherein the another portion of the projection step portion is formed at both sides of a track center line of the projection step portion.

3. A thin film head according to claim 1, wherein the width of the projection step portion in the track width direction at the air bearing surface is substantially equal to a width in the track width direction of the upper magnetic pole at the air bearing surface.

4. A thin film head according to claim 1, wherein a distance from a track center line of the projection step portion to an edge of the another portion in track width direction at the second depth position from the air bearing surface is greater than a distance from a track center line of the upper magnetic pole to an edge of the upper magnetic pole in the track width direction at the second depth position from the air bearing surface.

5. A thin film head according to claim 1, wherein the another portion of the projection step portion has rectangular contours.

6. The thin film head according to claim 1, wherein a front portion of the upper magnetic pole top layer is formed on the upper magnetic pole and the second insulating layer, and wherein the third width is larger than the width.

7. The thin film head according to claim 6, further comprising a second coil covered by the second insulating layer.

8. A thin film head having a reading part and a recording part comprising:

an upper magnetic pole having a first width at the air bearing surface and a second width which is larger than the first width from a first depth position from the air bearing surface;

a lower magnetic pole having a lower magnetic main layer, a lower magnetic pole front end portion on the lower magnetic main layer, and a projection step portion above the lower magnetic pole front end portion; and a non-magnetic insulating layer on the lower magnetic main layer, which is formed at an opposite side to the air bearing surface;

wherein the projection step portion includes one portion which faces the upper magnetic pole, and another portion which is formed from a second depth position to a third depth position from the air bearing surface and having a part which does not face the upper magnetic pole;

wherein a distance from the air bearing surface to the second depth position is shorter than a distance from the air bearing surface to the first depth; and wherein widths of the upper magnetic pole in the track width direction are equal from the air bearing surface to the first depth position.

9. A thin film head according to claim 8, wherein the projection step portion is formed at both sides of a track center line of the projection step portion.

10. A thin film head according to claim 8, wherein the width of the projection step portion in the track width direction at an air bearing surface is substantially equal to a width in the track width direction of the upper magnetic pole at the air bearing surface.

11. A thin film head according to claim 8, wherein a distance from a track center line of the projection step portion to an edge of the another portion in track width direction at the second depth position from the air bearing surface is greater than a distance from a track center line of the upper magnetic pole to an edge of the upper magnetic pole in the track width direction at the second depth position from the air bearing surface.

12. A thin film head according to claim 8, wherein the another portion of the projection step portion has rectangular contours.

13. A thin film head having a reading part and a recording part comprising:

an upper magnetic pole having a first width at an air bearing surface and a second width which is larger than the first width at a first depth position from the air bearing surface;

a lower magnetic pole having a lower magnetic main layer, and a projection step portion above the lower magnetic pole main layer; and, a non-magnetic insulating layer on the lower magnetic main layer, which is formed at an opposite side of the air bearing surface; and a gap layer disposed between the upper magnetic pole and the projection step portion;

an upper magnetic pole top layer recessed from the air bearing surface;

a first coil formed between the upper magnetic pole top layer and the lower magnetic main layer;

a first insulating layer formed on the gap layer and sharing an edge with the upper magnetic pole;

wherein the projection step portion includes one portion which faces the upper magnetic pole, and another portion formed from a second depth position to a third depth position from air bearing surface the another portion having a part which does not face the upper magnetic pole, wherein the upper magnetic pole has a third width at a fourth depth position which is defined by a closest edge from the air bearing surface of the first insulating layer;

wherein a distance between the fourth depth position and the air bearing surface is longer than a distance between the third depth position and the air bearing surface;

wherein a fourth width at the second depth position of the projection step portion is larger than a width in a track direction of the projection step portion at the air bearing surface;

wherein the first, second, third and fourth widths are widths in the track width direction; and wherein a distance from the air bearing surface to the second depth position of the another portion is shorter than a distance from the air bearing surface to the first depth position.

14. A thin film head according to claim 13, wherein the projection step portion is formed at both sides of a track center line of the projection step portion.

15. A thin film head according to claim 13, wherein the width of the projection step portion in the track width direction at an air bearing surface is substantially equal to a width in the track width direction of the upper magnetic pole at the air bearing surface.

16. A thin film head according to claim 13, wherein a distance from a track center line of the projection step portion to an edge of the another portion in track width direction at the second depth position from the air bearing surface is greater than a distance from a track center line of the upper magnetic pole to an edge of the upper magnetic pole in the track width direction at the second depth position from the air bearing surface.

17. A thin film head according to claim 13, wherein the another portion of the projection step portion has rectangular contours.

18. The thin film head according to claim 13, further comprising:

a second coil; and a second insulating layer covering the second coil;

wherein the first insulating layer covers the first coil;

wherein the first insulating layer is provided between the non-magnetic insulating layer and the second insulating layer;

wherein the third width is larger than the second width; and wherein the second insulating layer is provided between the upper magnetic pole top layer and the first insulating layer.

* * * * *